US012668445B2

(12) United States Patent
Kakehi et al.

(10) Patent No.: US 12,668,445 B2
(45) Date of Patent: Jun. 30, 2026

(54) CHARGE-ELIMINATING APPARATUS, IMAGE FORMING SYSTEM, AND CHARGE ADJUSTING APPARATUS

(71) Applicant: CANON KABUSHIKI KAISHA, Tokyo (JP)

(72) Inventors: Yutaka Kakehi, Chiba (JP); Yasuharu Chiyoda, Chiba (JP); Ryosuke Tsuruga, Chiba (JP); Yasushi Takeuchi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/977,067

(22) Filed: Dec. 11, 2024

(65) Prior Publication Data

US 2025/0197144 A1 Jun. 19, 2025

(30) Foreign Application Priority Data

Dec. 15, 2023 (JP) ................................ 2023-212348

(51) Int. Cl.
*G03G 15/00* (2006.01)
*B65H 5/06* (2006.01)
*B65H 7/20* (2006.01)

(52) U.S. Cl.
CPC ............... *B65H 7/20* (2013.01); *B65H 5/062* (2013.01); *G03G 15/6573* (2013.01); *B65H 2301/443246* (2013.01); *B65H 2301/5132* (2013.01); *B65H 2301/5133* (2013.01); *B65H 2551/10* (2013.01); *B65H 2801/27* (2013.01); *G03G 2215/00654* (2013.01)

(58) Field of Classification Search
CPC ....................... G03G 15/5016; G03G 15/6573
See application file for complete search history.

(56) References Cited

U.S. PATENT DOCUMENTS

| | | | | |
|---|---|---|---|---|
| 9,639,021 | B2 * | 5/2017 | Matsudaira | G03G 15/6573 |
| 2009/0060618 | A1 * | 3/2009 | Fujikura | G03G 15/60 399/407 |
| 2014/0054470 | A1 * | 2/2014 | Gorczyca | H01T 23/00 250/424 |
| 2022/0397858 | A1 * | 12/2022 | Sugiyama | G03G 21/203 |

FOREIGN PATENT DOCUMENTS

| | | |
|---|---|---|
| JP | 2019167169 A | 10/2019 |
| JP | 2023098240 A | 7/2023 |

* cited by examiner

*Primary Examiner* — Leslie J Evanisko
(74) *Attorney, Agent, or Firm* — Canon U.S.A., Inc. IP Division

(57) ABSTRACT

A charge-eliminating apparatus includes a charge-eliminating member configured to come into contact with a sheet and eliminate static charges from the sheet, a power supply configured to apply a voltage to the charge-eliminating member, a current detection circuit configured to detect a current flowing through the charge-eliminating member, and a control unit configured to control a value of the voltage by the power supply, based on a detection result obtained by the current detection circuit when the sheet passes over the charge-eliminating member, such that the current falls within a predetermined range with respect to a target value, wherein the control unit acquires a detection result of an environment detection sensor that detects an environmental condition, and wherein the control unit changes the target value based on the detection result of the environment detection sensor during execution of a job that eliminates static charges.

19 Claims, 10 Drawing Sheets

CHARGE-ELIMINATING APPARATUS, IMAGE FORMING SYSTEM, AND CHARGE ADJUSTING APPARATUS

BACKGROUND

Field of the Disclosure

The present disclosure relates to a charge-eliminating apparatus that eliminates static charges from sheets, an image forming system that forms images on sheets, and a charge adjusting apparatus that adjusts charges on sheets.

Description of the Related Art

Japanese Patent Application Laid-Open No. 2019-167169 discusses a charge-eliminating apparatus that eliminates static charges from sheets by using a charge-eliminating roll (a contact type static eliminator) that comes into contact with the sheets and a non-contact type static eliminator using the corotron method.

When the charge-eliminating roll is continuously energized, a resistance value of the charge-eliminating roll changes. Consequently, there are cases where it is difficult to appropriately adjust a charge-eliminated state and a charged state of these sheets.

SUMMARY

The present disclosure is directed to providing a charge-eliminating apparatus, an image forming system, and a charge adjusting apparatus that are capable of more appropriately adjusting a charge-eliminated state and a charged state of these sheets.

According to an aspect of the present disclosure, a charge-eliminating apparatus includes a charge-eliminating member configured to come into contact with a sheet and eliminate static charges from the sheet, a power supply configured to apply a voltage to the charge-eliminating member, a current detection circuit configured to detect a current flowing through the charge-eliminating member, and a control unit configured to control a value of the voltage applied to the charge-eliminating member by the power supply, based on a detection result obtained by the current detection circuit when the sheet passes over the charge-eliminating member, such that the current flowing through the charge-eliminating member when the sheet passes over the charge-eliminating member falls within a predetermined range with respect to a target value, wherein the control unit acquires a detection result of an environment detection sensor that detects an environmental condition, and wherein the control unit changes the target value based on the detection result of the environment detection sensor during execution of a job that eliminates static charges from a plurality of sheets while continuously conveying the plurality of sheets.

Further features of various embodiments will become apparent from the following description of exemplary embodiments with reference to the attached drawings.

DESCRIPTION OF THE EMBODIMENTS

Hereinafter, exemplary embodiments according to the present disclosure will be described with reference to the drawings.

Figure 1:
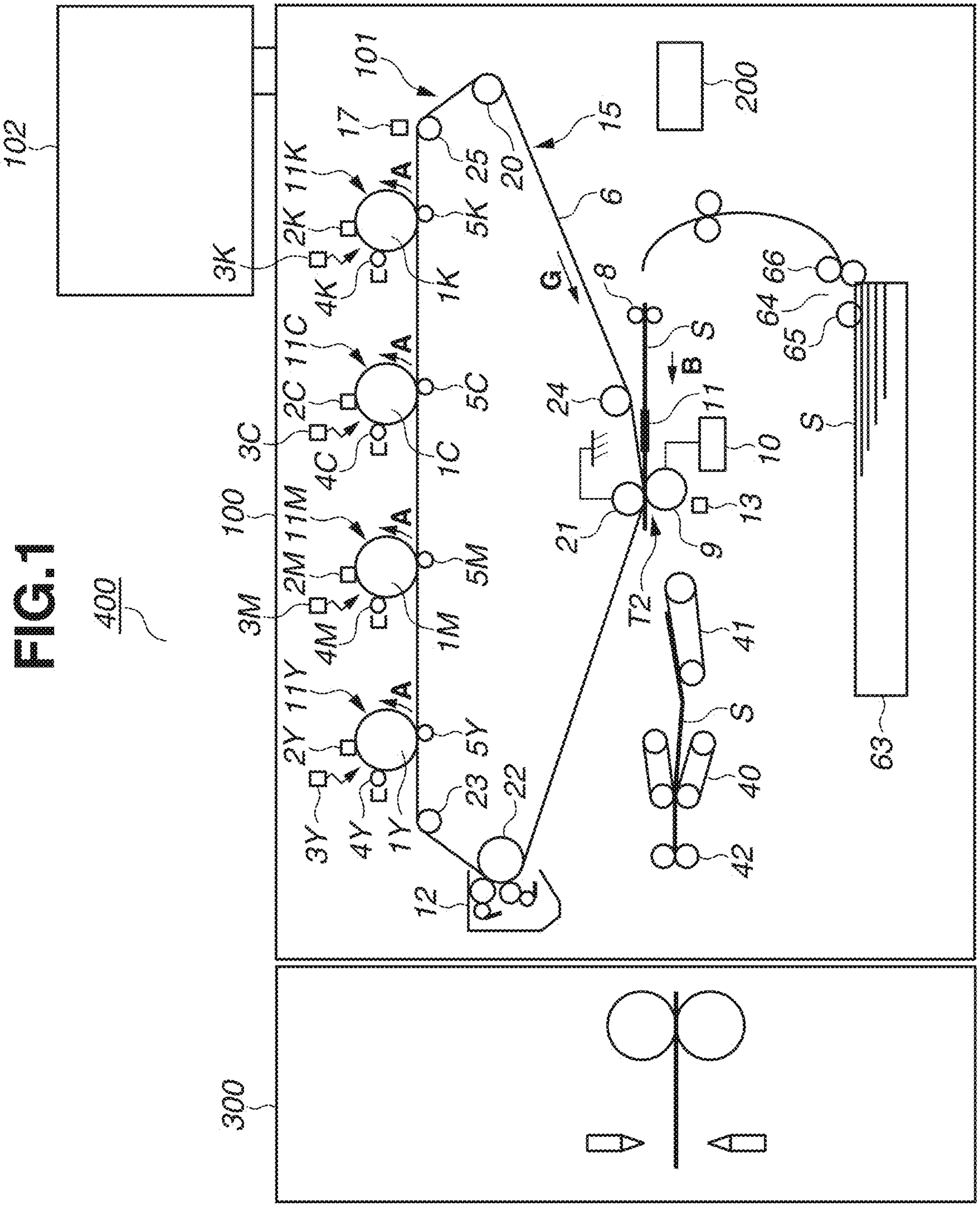
FIG. 1 schematically illustrates an image forming system according to a first exemplary embodiment.

FIG. 1 schematically illustrates an image forming system 400 according to a first exemplary embodiment. The image forming system 400 includes an image forming apparatus 100 (a printer) and a charge-eliminating apparatus 300 connected to the image forming apparatus 100. The image forming system 400 forms images on sheets S and discharges the sheets S as products (printed products). Various kinds of sheet materials different in size and material can be used as the sheets S, each of which is a recording material (a recording medium). Examples of the sheets S include paper such as plain paper and thick paper, a sheet material such as coated paper on which surface treatment has been performed, a sheet material having a special shape such as an envelope and index paper, a sheet material made of plastic, and cloth. Examples of the sheet material made of plastic include synthetic paper made of a synthetic resin as a main raw material, and a sheet for an overhead projector (overhead transparency (OHT) sheet).

The charge-eliminating apparatus 300 is an apparatus (a static eliminator) that eliminates (reduces) static charges from each sheet S discharged from the image forming system 400. The charge-eliminating apparatus 300 can also be referred to as a charge adjusting apparatus for adjusting a charged state of the sheet S discharged from the image forming system 400. The charge-eliminating apparatus 300 may have a function other than a charge-eliminating function (for example, a de-curling function of correcting a curl of the sheet S). While the charge-eliminating apparatus 300 according to the present exemplary embodiment is disposed as an apparatus provided separately from the image forming apparatus 100, the charge-eliminating apparatus 300 may be incorporated into a housing of the image forming apparatus 100.

The image forming system 400 may include an optional device other than the charge-eliminating apparatus 300. Examples of the optional device include a large-capacity feeding device (an optional feeder) for supplying the sheets S to the image forming apparatus 100 and a sheet processing device (a finisher) for performing processing such as binding processing on the sheets S on which images have been formed by the image forming apparatus 100.

<Image Forming Apparatus>

FIG. 1 schematically illustrates a configuration of the image forming apparatus 100. The image forming apparatus

100 includes an image forming section 101, which is an intermediate transfer electrophotographic mechanism. The image forming section 101 includes four process units 11Y, 11M, 11C, and 11K including photosensitive drums 1Y, 1M, 1C, and 1K, respectively, and a transfer unit 15 including an intermediate transfer belt 6 and a secondary transfer roller 9.

Each of the process units includes the photosensitive drum as an image bearing member (a latent image bearing member), and also includes a charging device, an exposure device, and a developing device as process units that act on the corresponding photosensitive drum to perform each step of an electrophotographic process. More specifically, the process unit 11Y includes the photosensitive drum 1Y, a charging device 2Y, an exposure device 3Y, and a developing device 4Y. The process unit 11M includes the photosensitive drum 1M, a charging device 2M, an exposure device 3M, and a developing device 4M. The process unit 11C includes the photosensitive drum 1C, a charging device 2C, an exposure device 3C, and a developing device 4C. The process unit 11K includes the photosensitive drum 1K, a charging device 2K, an exposure device 3K, and a developing device 4K.

Each of the photosensitive drums 1Y, 1M, 1C, and 1K is rotary driven in its predetermined rotational direction A. The process units 11Y, 11M, 11C, and 11K have substantially the same configuration except that different toners are accommodated as developers in the developing devices 4Y, 4M, 4C, and 4K.

The transfer unit 15 includes the intermediate transfer belt 6 as an intermediate transfer member, the secondary transfer roller 9 as a transfer unit (a secondary transfer unit), primary transfer rollers 5Y, 5M, 5C, and 5K, a plurality of rollers 20, 21, 22, 23, 24, and 25, and a belt cleaner 12. The intermediate transfer belt 6 is stretched around the plurality of rollers 20, 21, 22, 23, 24, and 25. The primary transfer rollers 5Y, 5M, 5C, and 5K are disposed on the inner surface side of the intermediate transfer belt 6 and at positions corresponding to the photosensitive drums 1Y, 1M, 1C, and 1K, respectively. Primary transfer portions are formed between the primary transfer rollers 5Y, 5M, 5C, and 5K and the photosensitive drums 1Y, 1M, 1C, and 1K, respectively. The roller 20 is a tension roller that applies an appropriate tension to the intermediate transfer belt 6. The roller 22 is a driving roller that rotary drives the intermediate transfer belt 6 in a predetermined rotational direction G. The secondary transfer roller 9 is disposed such that the secondary transfer roller 9 is in contact with the outer surface of the intermediate transfer belt 6 and sandwiches the intermediate transfer belt 6 together with an opposing roller 21 (a secondary transfer opposing roller). A secondary transfer portion T2 is formed as a nip portion between the secondary transfer roller 9 and the intermediate transfer belt 6. The secondary transfer portion T2 is a transfer portion where a toner image is transferred onto the sheet S.

The image forming apparatus 100 includes a transfer power supply 10 as a voltage applying unit that forms a bias electric field for transferring a toner image at the secondary transfer portion T2. In the present exemplary embodiment, the secondary transfer roller 9, which is the outer roller of the secondary transfer portion T2, is electrically connected to the transfer power supply 10, and a predetermined transfer voltage is applied from the transfer power supply 10. The transfer voltage is a voltage having a polarity opposite to a normal charging polarity of toner used for image formation. The opposing roller 21, which is the inner roller of the secondary transfer portion T2, is electrically connected to a ground potential GND (a metallic frame or the like) of the image forming apparatus 100. Also, the inner roller of the secondary transfer portion T2 may be connected to the transfer power supply 10, and the outer roller of the secondary transfer portion T2 may be connected to the ground potential GND. In this case, the transfer voltage having the same polarity as the normal charging polarity of the toner is applied to the inner roller.

The image forming apparatus 100 further includes a storage unit 63 (a container, a cassette) that stores the sheets S, a feeding unit 64 that feeds the sheets S, and a registration roller 8 that performs registration (alignment) of the sheets S. Further, the image forming apparatus 100 includes a pre-fixing conveying device 41 that conveys a sheet S that has passed through the secondary transfer portion T2, a fixing device 40 that fixes a toner image to the sheet S, and a discharge roller pair 42 as a discharge unit that discharges the sheet S to the outside of the image forming apparatus 100.

The feeding unit 64 includes, for example, a pickup roller 65 that feeds the uppermost sheet S from the storage unit 63 in a sheet feeding direction, and a separation roller pair 66 that conveys the fed sheets S one by one while separating the sheets S from one another. The separation roller pair 66 includes a conveying roller that conveys the uppermost sheet S in the sheet feeding direction and a separation roller that is in contact with the conveying roller and that forms a separation nip together with the conveying roller. The separation roller applies a frictional force to sheets S at the separation nip, to prevent these sheets S other than the uppermost sheet S from passing through the separation nip. In this way, double feeding of the sheets S is prevented. The separation roller is an example of a separation member that separates the sheets S, and for example, a pad-shaped elastic member (a rubber pad) may be used as the separation member.

The fixing device 40 is a heat fixing device that has a fixing nip and heats the toner image on the sheet S while nipping and conveying the sheet S at the fixing nip. The fixing device 40 includes a heating member that comes into contact with the surface of the sheet S on which the toner image is formed, a pressure member that forms the fixing nip together with the heating member, and a heat source that heats the heating member. For example, a belt member stretched over a plurality of rollers or a rigid roller member can be used as the heating member and the pressure member. As the heat source, for example, a halogen lamp or an induction heating (IH) mechanism of an IH system can be used.

The image forming apparatus 100 includes a user operation unit 102, which is a user interface of the image forming system 400. The user operation unit 102 includes a display unit, such as a liquid crystal panel, that displays information to a user, and an input unit, such as physical buttons and a touch panel function of a liquid crystal panel, that receives input of information from the user. The user can set setting information and an execution condition of an image forming operation to the image forming system 400 by operating the user operation unit 102. The setting information is, for example, attribute information such as the size, material, and brand of the sheets S stored in the storage unit 63. The execution condition of the image forming operation is, for example, a value of the transfer voltage.

When the user enters an instruction to execute image formation, a control unit of the image forming apparatus 100 starts an image forming job, which is a series of tasks of outputting a product by forming an image while conveying the sheets S one by one. Hereinafter, a series of operations in which the image forming apparatus 100 forms an image on a sheet S will be referred to as the image forming operation. The image forming job includes the image forming operation on at least one sheet S.

In the image forming operation, the process units 11Y, 11M, 11C, and 11K form toner images in their respective colors. Specifically, the photosensitive drums 1Y, 1M, 1C, and 1K are rotary driven, and the charging devices 2Y, 2M, 2C, and 2K uniformly charge surfaces of the photosensitive drums 1Y, 1M, 1C, and 1K. The exposure devices 3Y, 3M, 3C, and 3K expose the photosensitive drums 1Y, 1M, 1C, and 1K based on image information received together with the execution instruction, and form electrostatic latent images on the surfaces of the photosensitive drums 1Y, 1M, 1C, and 1K. The developing devices 4Y, 4M, 4C, and 4K supply yellow, magenta, cyan, and black toners to the photosensitive drums 1Y, 1M, 1C, and 1K, respectively, and develop the electrostatic latent images into toner images of their respective colors.

In the present exemplary embodiment, a reversal development method is used. More specifically, after each charging device charges the surface of its corresponding photosensitive drum to the same polarity as the normal charging polarity of the toner, the potential of an exposed area exposed by the corresponding exposure device is attenuated, and the toner adheres to the exposed area during development.

The toner images formed in the process units 11Y, 11M, 11C, and 11K are primarily transferred from the photosensitive drums 1Y, 1M, 1C, and 1K to the intermediate transfer belt 6 at their respective primary transfer portions. A transfer voltage having a polarity opposite to the normal charging polarity of the toner is applied to the primary transfer rollers 5Y, 5M, 5C, and 5K by constant voltage control.

In the present exemplary embodiment, the primary transfer rollers 5Y, 5M, 5C, and 5K are conductive rollers each including a core metal and a conductive elastic layer formed on the outer peripheral side of the core metal. The elastic layer is formed of, for example, ion conductive foam rubber. The ion conductive foam rubber is a foam rubber material in which a conductive agent for inducing ion conductivity is dispersed. Known materials used for a transfer roller can be used as the conductive agent and the foam rubber material. For example, a roller having an outer diameter of 15 to 20 mm and a resistance value of 1E+5 to 1E+8Ω when a voltage of 2 kV is applied under environmental conditions of 23° C. and 50% relative humidity (RH) may be used suitably as each primary transfer roller.

The intermediate transfer belt 6 is rotary driven at a predetermined circumferential speed (process speed) equal to the circumferential speed of the photosensitive drums 1Y, 1M, 1C, and 1K. The circumferential speed in the present exemplary embodiment is 150 to 470 mm/sec. With the rotation of the intermediate transfer belt 6, a toner image is transferred at an upstream primary transfer portion, and toner images of the other colors are sequentially transferred onto the toner image. In this way, a full-color toner image is formed on the intermediate transfer belt 6. The full-color toner image is carried on the intermediate transfer belt 6 and is conveyed toward the secondary transfer portion T2.

In parallel with the formation of the toner image by the image forming section 101, the feeding unit 64 feeds the sheets S one by one to the image forming section 101. A fed sheet S is conveyed to the secondary transfer portion T2 by the registration roller 8 in synchronization with a timing of conveyance of the toner image on the intermediate transfer belt 6 to the secondary transfer portion T2. Next, at the secondary transfer portion T2, the toner image is transferred (secondarily transferred) from the intermediate transfer belt 6 onto the sheet S.

In the present exemplary embodiment, the secondary transfer roller 9 is a conductive roller including a core metal and a conductive elastic layer formed on the outer peripheral side of the core metal. The elastic layer is formed of, for example, ion conductive foam rubber. The ion conductive foam rubber is a foam rubber material in which a conductive agent for inducing ion conductivity is dispersed. Known materials used for a transfer roller can be used as the conductive agent and the foam rubber material. For example, a roller having an outer diameter of 20 to 25 mm and the resistance value of 1E+5 to 1E+8Ω when a voltage of 2 kV is applied under the environmental conditions of 23° C. and 50% RH may be used suitably as the secondary transfer roller 9.

The opposing roller 21 is a conductive roller including a core metal and an elastic layer formed on the outer peripheral side of the core metal. The elastic layer is formed of electron conductive foam rubber. The electron conductive foam rubber is a foam rubber material in which a conductive agent for inducing electron conductivity is dispersed. Known materials used for a transfer roller can be used as the conductive agent and the foam rubber material. For example, a roller having an outer diameter of 20 to 22 mm and a resistance value of 1E+5 to 1E+8Ω when a voltage of 50 V is applied under the environmental conditions of 23° C. and 50% RH may be used suitably as the opposing roller 21.

During the secondary transfer, a transfer voltage having the polarity opposite to the normal charging polarity of the toner is applied to the secondary transfer roller 9 from the transfer power supply 10 by constant voltage control. The transfer voltage is, for example, +1 to +7 kV, and is automatically adjusted such that a current of +40 to +120 μA flows from the secondary transfer roller 9 to the opposing roller 21. The application of the transfer voltage forms a bias electric field at the secondary transfer portion T2 such that the potential of the secondary transfer roller 9 has the polarity opposite to the normal charging polarity of the toner on the intermediate transfer belt 6. With this bias electric field, an electrostatic force acts on the toner on the intermediate transfer belt 6 in a direction toward the secondary transfer roller 9. Thus, the toner transfers from the intermediate transfer belt 6 to the sheet S passing through the secondary transfer portion T2. In this way, the toner image is transferred onto the sheet S.

A conveyance guide 11 for improving positional accuracy of the sheet S with respect to the intermediate transfer belt 6 is provided immediately before the secondary transfer portion T2. Further, transfer residual toner that has not transferred onto the sheet S and remains on the intermediate transfer belt 6 is collected by the belt cleaner 12 and is reused for the image formation.

The sheet S that has passed through the secondary transfer portion T2 is conveyed to the fixing device 40 by the pre-fixing conveying device 41, and is subjected to a toner image fixing process executed by the fixing device 40. The fixing process is a process in which the toner image on the sheet S is heated and pressurized while the sheet S is nipped at the nip portion of the fixing device 40 and conveyed. For example, the pre-fixing conveying device 41 conveys the sheet S carried on an endless rubber belt. The rubber belt may be a belt that has a width of 100 to 110 mm and a thickness of 1 to 3 mm and that is made of ethylene-propylene-diene monomer (EPDM). The rubber belt has holes each having a diameter of 3 to 7 mm, and by generating a negative pressure on the inner side of the rubber belt by using a fan, the sheet S can be stably carried on the rubber belt.

The sheet S that has passed through the fixing device 40 is discharged to the charge-eliminating apparatus 300 by the discharge roller pair 42.

The intermediate-transfer-type image forming section 101 described above is an example of an image forming unit that forms images on the sheets S. The image forming unit may be, for example, a direct-transfer-type electrophotographic unit. In this case, a toner image formed on a photosensitive drum as an image bearing member is directly transferred from the photosensitive drum to a sheet S at a transfer nip (transfer portion) where the photosensitive drum and a transfer roller face each other.

At the transfer nip, a bias electric field is formed such that the potential of the transfer roller has a polarity opposite to the normal charging polarity of the toner on the photosensitive drum.

<Charge-Eliminating Apparatus>

Figure 2:
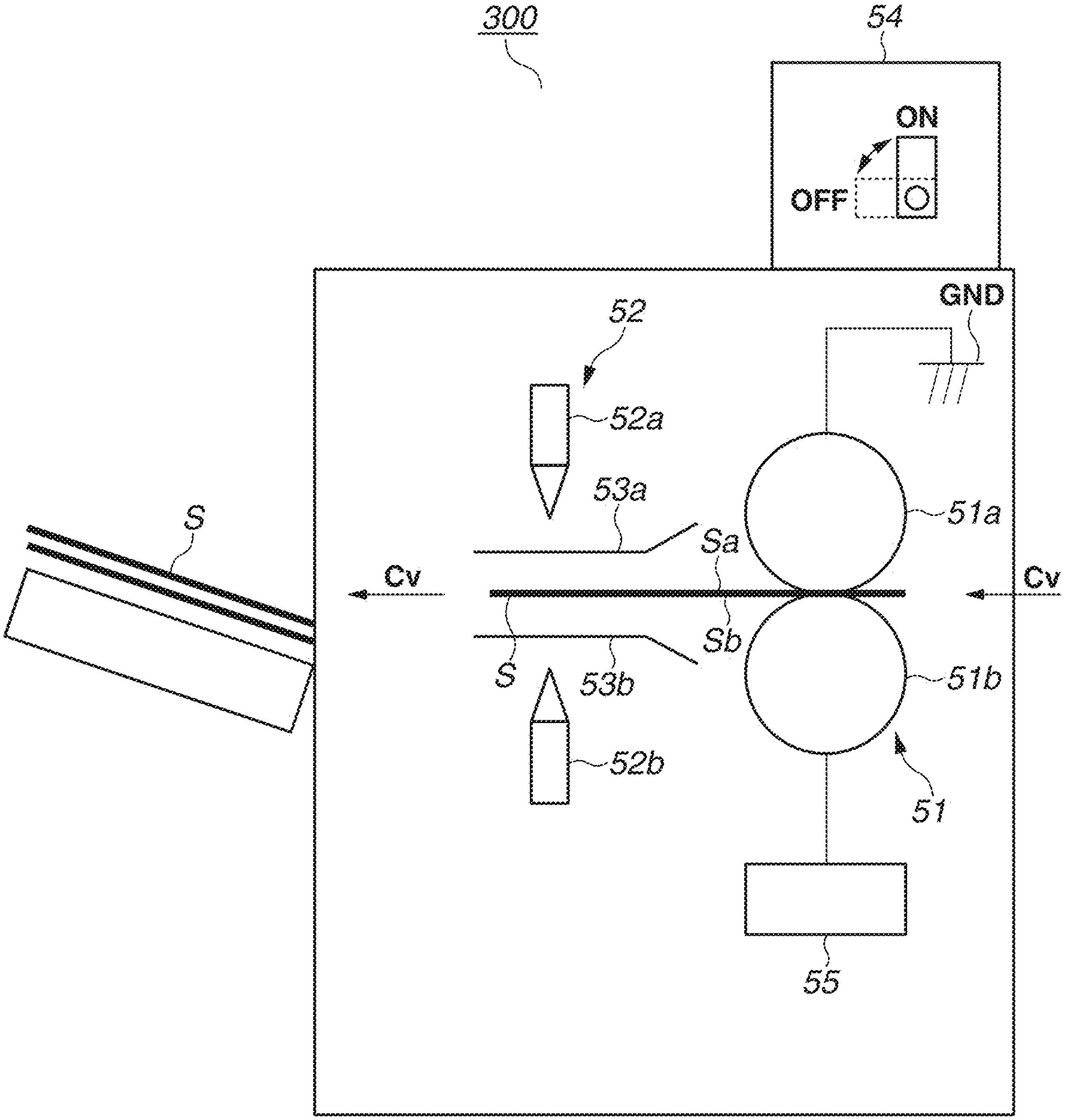
FIG. 2 schematically illustrates a charge-eliminating apparatus according to the first exemplary embodiment.

FIG. 2 schematically illustrates the charge-eliminating apparatus 300 according to the first exemplary embodiment. In the present exemplary embodiment, the charge-eliminating apparatus 300 is connected to the image forming apparatus 100 on the downstream side. The charge-eliminating apparatus 300 receives a sheet S on which an image has been formed by the image forming apparatus 100 and executes charge elimination on the sheet S (reduction of the static charges from the sheet surface) while conveying the sheet S in a sheet conveying direction Cv. By executing the charge elimination on the sheet S, the sheets S discharged from the image forming system 400 and stacked can be prevented from being stuck to each other due to electrostatic adsorption, and alignment of the sheets S can be prevented from being deteriorated due to sticking of the sheets. The charge-eliminating apparatus 300 includes a charge-eliminating roller pair 51 serving as a contact type static eliminator, and includes an ionizer unit 52 serving as a non-contact type static eliminator.

The charge-eliminating roller pair 51 includes a charge-eliminating opposing roller 51*a* that comes into contact with a first surface Sa of the sheet S and a charge-eliminating roller 51*b* that comes into contact with a second surface Sb, which is the opposite surface of the first surface Sa of the sheet S. The charge-eliminating roller 51*b* is a contact type charge-eliminating member that comes into contact with the sheet S being conveyed and that eliminates the static charges from the sheet S. The charge-eliminating opposing roller 51*a* is in contact with the charge-eliminating roller 51*b*. A charge-eliminating nip is formed as a nip portion between the charge-eliminating roller 51*b* and the charge-eliminating opposing roller 51*a*. The charge-eliminating roller pair 51 executes the charge elimination on the sheet S while nipping and conveying the sheet S at the charge-eliminating nip.

The charge-eliminating opposing roller 51*a* is connected to the ground potential GND. The charge-eliminating opposing roller 51*a* is electrically connected to, for example, a metallic frame of the charge-eliminating apparatus 300 and is electrically grounded.

The charge-eliminating roller 51*b* is connected to a high-voltage power supply 55. The high-voltage power supply 55 is a voltage applying unit that applies, to the charge-eliminating roller 51*b*, a voltage (a charge-eliminating voltage) for eliminating the static charges from the sheet S.

Also, the charge-eliminating roller 51*b* may be disposed to be in contact with the first surface Sa of the sheet S, and the charge-eliminating opposing roller 51*a* may be disposed to be in contact with the second surface Sb of the sheet S. In this case, the voltage applied to the charge-eliminating roller 51*b* has a polarity opposite to that of the voltage applied to the charge-eliminating roller 51*b* in the present exemplary embodiment.

In the present exemplary embodiment, the charge-eliminating roller 51*b* is a conductive roller including a core metal and a conductive elastic layer formed on the outer peripheral side of the core metal. The elastic layer is formed of, for example, ion conductive foam rubber. The ion conductive foam rubber is a foam rubber material in which a conductive agent for inducing ion conductivity is dispersed. Known materials can be used as the conductive agent and the foam rubber material. For example, a roller having an outer diameter of 20 to 25 mm and the resistance value of 1E+5 to 1E+8Ω when a voltage of 2 kV is applied under the environmental conditions of 23° C. and 50% RH may be used suitably as the charge-eliminating roller 51*b*. The charge-eliminating opposing roller 51*a* is a roller made of stainless steel (SUS) and having an outer diameter of 20 to 25 mm. Also, a roller made of metal, such as stainless steel, may be used as the charge-eliminating roller 51*b*.

The ionizer unit 52 includes a first ionizer 52*a* facing the first surface Sa of the sheet S, and includes a second ionizer 52*b* facing the second surface Sb of the sheet S. Each of the first ionizer 52*a* and the second ionizer 52*b* has an electrode needle. By applying a voltage between the electrode needles, corona discharge is generated between the tips of the needles, and air around the tips of the needles is ionized. Then, generated ions neutralize charges on the surfaces of the sheet S. In this way, the static charges are eliminated from the sheet S.

Figure 3:
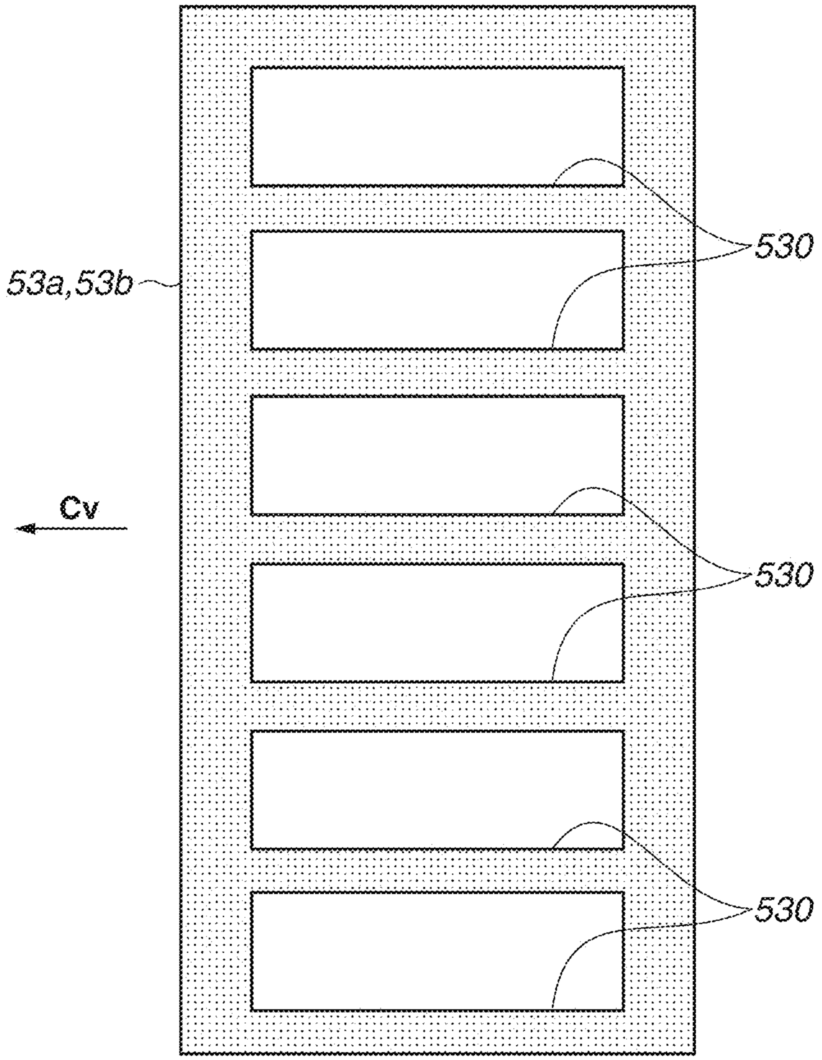
FIG. 3 schematically illustrates a conveyance guide according to the first exemplary embodiment.

Regarding the ionizer unit 52 according to the present exemplary embodiment, bar-type ionizers IZS40 (manufactured by SMC Corporation) are disposed as the first ionizer 52*a* and the second ionizer 52*b* above and below a sheet conveying path. Conveyance guides 53*a* and 53*b* forming the sheet conveying path of the ionizer unit 52 are made of, for example, a synthetic resin of polycarbonate (PC) and acrylonitrile-butadiene-styrene (ABS). The volume resistivity of the conveyance guides 53*a* and 53*b* is, for example, $1\times10^{14}$ Ω·cm. Further, as illustrated in FIG. 3, a plurality of holes 530 is formed in each of the conveyance guides 53*a* and 53*b* such that the ions discharged from the first ionizer 52*a* and the second ionizer 52*b* are not physically blocked. The plurality of holes 530 is arranged in a row in a sheet width direction perpendicular to the sheet conveying direction Cv.

The first ionizer 52*a* and the second ionizer 52*b* described above are examples of a non-contact type static eliminator, and a different non-contact type static eliminator may be used. For example, a corotron type or scorotron type static eliminator that eliminates static charges from a sheet by corona discharge generated from a discharging wire may be used. The non-contact type static eliminator is not necessarily provided on each side of the sheet conveying path, and for example, the charge-eliminating apparatus 300 may be configured to include only the first ionizer 52*a* as the non-contact type static eliminator. If the static charges can be sufficiently eliminated from the sheet S by the charge-eliminating roller 51*b*, the non-contact type static eliminator may be omitted.

First, most of the static charges on the sheet S conveyed from the image forming apparatus 100 to the charge-eliminating apparatus 300 are eliminated (roughly removed) at the charge-eliminating nip of the charge-eliminating roller pair 51. Specifically, the charge-eliminating voltage is set to have a polarity opposite to that of the transfer voltage applied to the secondary transfer roller 9. The value of the charge-eliminating voltage is set within a range of −1 kV to −6 kV.

At the secondary transfer portion T2 (FIG. 1), normally, the sheet S is charged such that its first surface Sa, which has been in contact with the intermediate transfer belt 6, has a negative polarity and its second surface Sb, which has been in contact with the secondary transfer roller 9, has a positive polarity. By applying the charge-eliminating voltage having a polarity opposite to that of the transfer voltage to the charge-eliminating roller 51*b*, a current flows between the charge-eliminating roller 51*b* and the charge-eliminating opposing roller 51*a* such that positive charges are supplied to the first surface Sa and negative charges are supplied to the second surface Sb of the sheet S. In this way, the application of the charge-eliminating voltage to the charge-eliminating roller 51*b* generates a current flowing through the sheet S at the charge-eliminating nip. As a result, the amount of static charges on the sheet S, which is the amount of charges carried on the first surface Sa and the second surface Sb of the sheet S, is reduced.

The sheet S that has passed through the charge-eliminating roller pair 51 is subjected to further charge elimination by the ionizer unit 52.

Specifically, charges remaining on the first surface Sa and the second surface Sb of the sheet S are neutralized by the ions emitted from the first ionizer 52*a* and the second ionizer 52*b*, and the amount of static charges on the sheet S is further reduced. The sheet S that has passed through the ionizer unit 52 is discharged to the outside of the charge-eliminating apparatus 300.

The amount of static charges on the sheet S is usually proportional to the surface potential of the sheet S. The amount of static charges on the sheet S may be expressed by the amount of charges per unit area on the sheet surface (surface charge density). Therefore, the "amount of static charges" on the sheet S in the following description may be replaced by the surface potential of the sheet S or the surface charge density of the sheet S.

<Charge-Eliminating Voltage Adjustment Switch>

Figure 4:
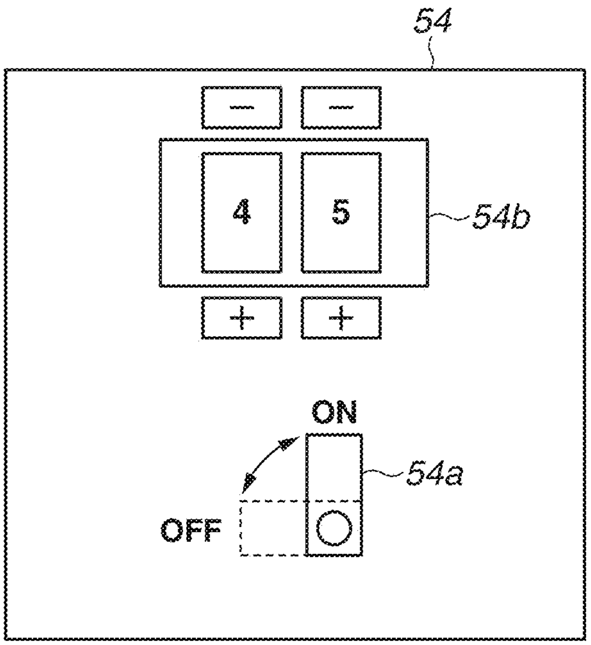
FIG. 4 illustrates a charge elimination operation unit according to the first exemplary embodiment.

The charge-eliminating apparatus 300 includes a charge elimination operation unit 54 with which an operation for changing operation conditions of the charge-eliminating apparatus 300 can be performed. FIG. 4 is an enlarged view of the charge elimination operation unit 54. The charge elimination operation unit 54 is an example of an input unit (a setting unit) with which the user can enter (set) the value of the voltage to be applied to the charge-eliminating roller 51*b* (the charge-eliminating member) from the high-voltage power supply 55 (the voltage applying unit).

The charge elimination operation unit 54 includes an ON/OFF switching switch 54*a* and a voltage adjustment switch 54*b*. By operating the ON/OFF switching switch 54*a*, the user can switch between an output start (ON) and an output stop (OFF) of the charge-eliminating voltage by the high-voltage power supply 55 (FIG. 2), which applies the charge-eliminating voltage to the charge-eliminating roller 51*b*. The user can adjust the value of the charge-eliminating voltage with the voltage adjustment switch 54*b*.

The value of the charge-eliminating voltage may be fixed to a value set in advance based on the category of the sheet S. For example, it is known that, when the sheet S is a plastic film or synthetic paper, the amount of static charges on the sheet S is likely to be larger because the plastic film or synthetic paper is dielectrically-polarized more strongly at the secondary transfer portion, compared to plain paper. Therefore, when a plastic film or synthetic paper is used as the sheet S, the value of the charge-eliminating voltage may be set in advance based on the category of the sheet S such that the charge-eliminating voltage becomes higher (the absolute value becomes larger) than when plain paper is used as the sheet S. However, even for sheets S of the same category, the value of the appropriate charge-eliminating voltage can vary in some cases due to a difference in electrical resistance caused by a difference in specific material, a difference in thickness, a difference in use environment, and the like. Therefore, the present exemplary embodiment is configured such that the user can adjust the value of the charge-eliminating voltage.

The voltage adjustment switch 54*b* according to the present exemplary embodiment includes a display unit that displays the value of the charge-eliminating voltage in two digits, and buttons ("+" buttons and "−" buttons) for increasing and decreasing the value of the charge-eliminating voltage. Pressing one of the "+" buttons increases the number of its corresponding digit, and pressing one of the "−" buttons decreases the number of its corresponding digit.

The value displayed on the display unit is the absolute value of the charge-eliminating voltage that is indicated by a two-digit number in units of 0.1 kV. In other words, a value obtained by multiplying the value displayed on the display unit of the voltage adjustment switch 54*b* by −0.1 kV is the setting value of the charge-eliminating voltage. For example, when "45" is displayed on the display unit of the voltage adjustment switch 54*b*, the setting value of the charge-eliminating voltage is −4.5 kV. When the "−" button of the tens place is pressed once and the "+" button of the ones place is pressed twice from this state, the display indicates "37", and the value of the charge-eliminating voltage is set to −3.7 kV.

When the display is set to "00" with the voltage adjustment switch 54*b*, the setting value of the charge-eliminating voltage is set to 0 V (0.0 kV). In this case, the high-voltage power supply 55 is in the same state as a state when the ON/OFF switching switch 54*a* is set to OFF. This state can also be referred to as a state in which the high-voltage power supply 55 applies 0 V to the charge-eliminating roller 51*b*.

The display method and the input method of the value of the charge-eliminating voltage are not limited to the above-described methods. Instead of displaying the upper two digits of the value of the charge-eliminating voltage, an actual value of the charge-eliminating voltage may be displayed, or a numerical value representing the level of the charge-eliminating voltage in, for example, 10 levels may be displayed. The value of the charge-eliminating voltage may be displayed, for example, on the user operation unit 102 or on a screen of an external computer that is connected to the image forming system 400 such that the external computer can communicate with the image forming system 400. As to the input method of the value of the charge-eliminating voltage, the charge elimination operation unit 54 may be provided with a numeric keypad for entering a numerical value, a touch panel operation may be performed on the user operation unit 102, or an input may be received via the external computer. The user operation unit 102 is another example of the input unit (the setting unit) with which the user can enter (set) the value of the voltage to be applied to the charge-eliminating roller 51*b* (the charge-eliminating member) from the high-voltage power supply 55 (the voltage applying unit).

<Charge-Eliminating Voltage Correction Control>

When the voltage is continuously applied to the charge-eliminating roller 51*b*, the resistance value of the charge-eliminating roller 51*b* can change. For example, when a conductive roller containing an ion conductive agent is used as the charge-eliminating roller 51*b* as in the present exemplary embodiment, the resistance value in the roller can change because distribution of the conductive agent may become uneven due to the continuous energization. In such a case, when the setting value of the charge-eliminating voltage that has been set via the charge elimination operation unit 54 in a state before the resistance value of the charge-eliminating roller 51*b* is changed is continuously used, when the resistance value of the charge-eliminating roller 51*b* changes, the charge-eliminating roller 51*b* can fail to appropriately eliminate the static charges from the sheet S. In other words, because the capability of the charge-eliminating roller 51*b* to supply charges to the sheet S is affected by the change in the resistance value of the charge-eliminating roller 51*b*, the amount of charges actually applied to the sheet S can become excessive or insufficient with respect to the amount of charges needed for eliminating the static charges from the sheet S.

While the resistance value of an ion conductive agent is less likely to fluctuate compared to the resistance value of an electron conductive agent, the resistance value of the ion conductive agent can fluctuate due to continuous energization as described above. In addition, while the change in the resistance value when the charge-eliminating roller 51*b* is a conductive roller containing the ion conductive agent has been described, the resistance value of the charge-eliminating roller 51*b* (the charge-eliminating member) can also change for other reasons. For example, the resistance value of the charge-eliminating roller 51*b* can change due to adhesion of paper dust (paper fiber or filler) generated from the sheet S or dirt such as toner to the surface of the charge-eliminating roller 51*b*.

Therefore, in the present exemplary embodiment, feedback control is performed to automatically correct the charge-eliminating voltage based on a detection result of a charge-eliminating current during sheet supply.

Figure 5:
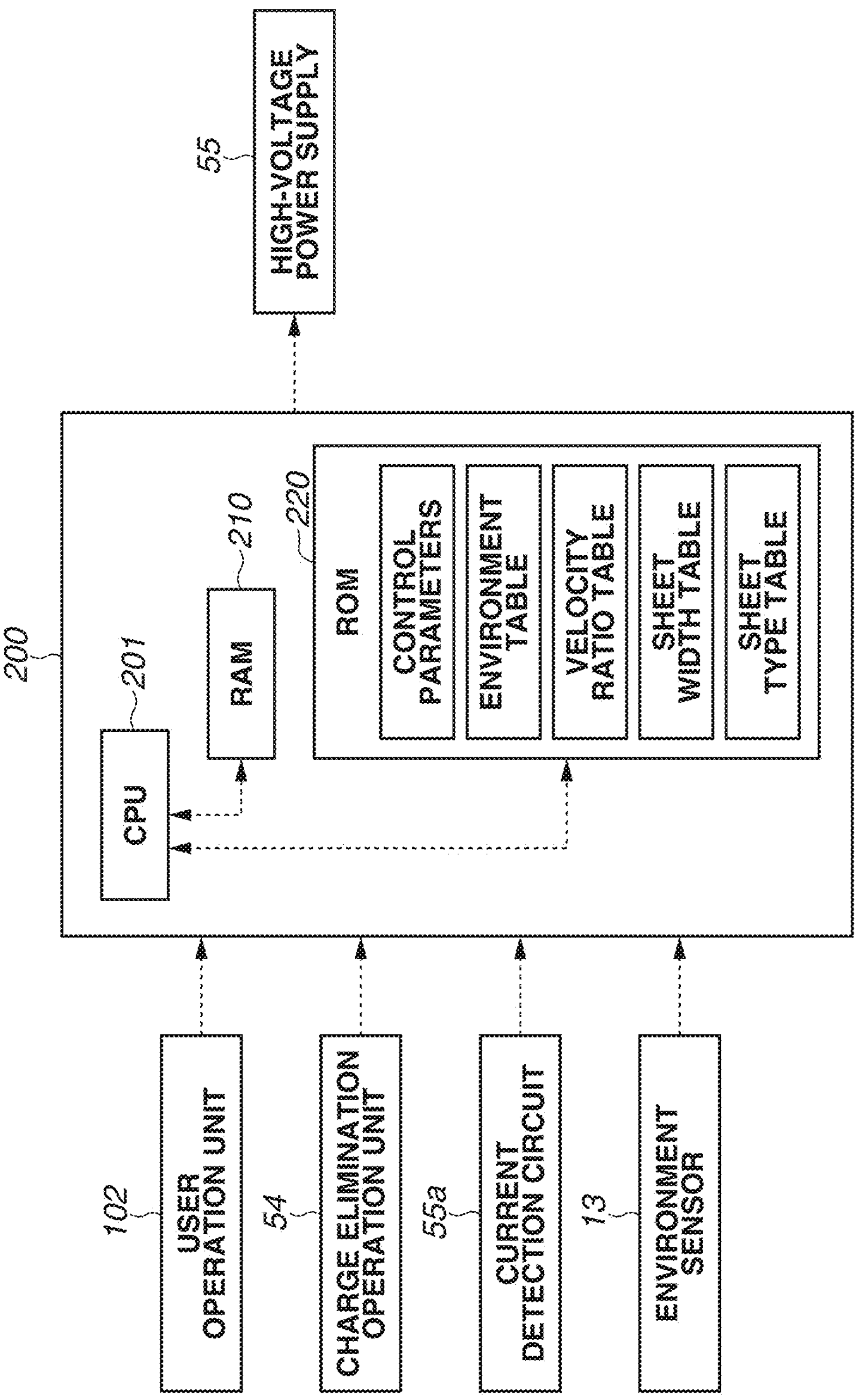
FIG. 5 is a block diagram of a control system according to the first exemplary embodiment.

FIG. 5 is a block diagram of a control circuit 200 relating to the control of the charge-eliminating voltage. The control circuit 200 is an example of a control unit that controls the operation of the charge-eliminating apparatus 300. The control circuit 200 may be mounted in a main body of the charge-eliminating apparatus 300, or part or all of functions of the control circuit 200 may be mounted on the image forming apparatus 100.

As illustrated in FIG. 5, the control circuit 200 includes a central processing unit (CPU) 201, a random access memory (RAM) 210, and a read-only memory (ROM) 220. The CPU 201 is an execution unit that reads and executes a control program.

The RAM 210 is a work area where the CPU 201 executes the control program. The ROM 220 is an example of a storage unit that stores various kinds of information, such as setting information relating to the control of the charge-eliminating apparatus 300. The control circuit 200 is connected with the user operation unit 102, the charge elimination operation unit 54, the high-voltage power supply 55, and the transfer power supply 10. A current detection circuit 55*a* detects a current supplied from the high-voltage power supply 55 to the charge-eliminating roller 51*b*. The current detection circuit 55*a* functions as a current detection unit that detects a current flowing through the charge-eliminating roller 51*b* (the charge-eliminating member).

The CPU 201 acquires information such as information (job information) relating to an image forming job, the setting value of the charge-eliminating voltage, a value of the current (referred to as the charge-eliminating current) flowing through the charge-eliminating roller 51*b* when the charge-eliminating voltage is applied, and a value of a transfer voltage output from the transfer power supply 10. The CPU 201 stores the acquired information in the RAM 210. The job information is, for example, attribute information about the sheet S, and the attribute information has been entered by the user via the user operation unit 102 and is used for the current image forming job. The setting value of the charge-eliminating voltage is a value set by the user operating the charge elimination operation unit 54. The value of the charge-eliminating current is a value detected by the current detection circuit 55*a*. During a period (during sheet supply) in which the sheet S passes through the charge-eliminating nip, the value of the charge-eliminating current corresponds to the amount of charges supplied from the charge-eliminating roller 51*b* to the sheet S per unit time. The CPU 201 calculates a corrected charge-eliminating voltage based on the above-described information stored in the RAM 210 and control conditions stored in the ROM 220, which will be described below. Next, the CPU 201 performs the feedback control for controlling the output of the high-voltage power supply 55 based on the corrected charge-eliminating voltage.

In addition, the control circuit 200 is connected with an environment sensor 13 that detects environmental conditions of an installation environment (space around the apparatus) of the charge-eliminating apparatus 300 (the image forming system 400). The control using the environment sensor 13 will be described in a second exemplary embodiment. The ROM 220 stores control parameters and various kinds of tables used for controlling the charge-eliminating voltage.

Figure 6:
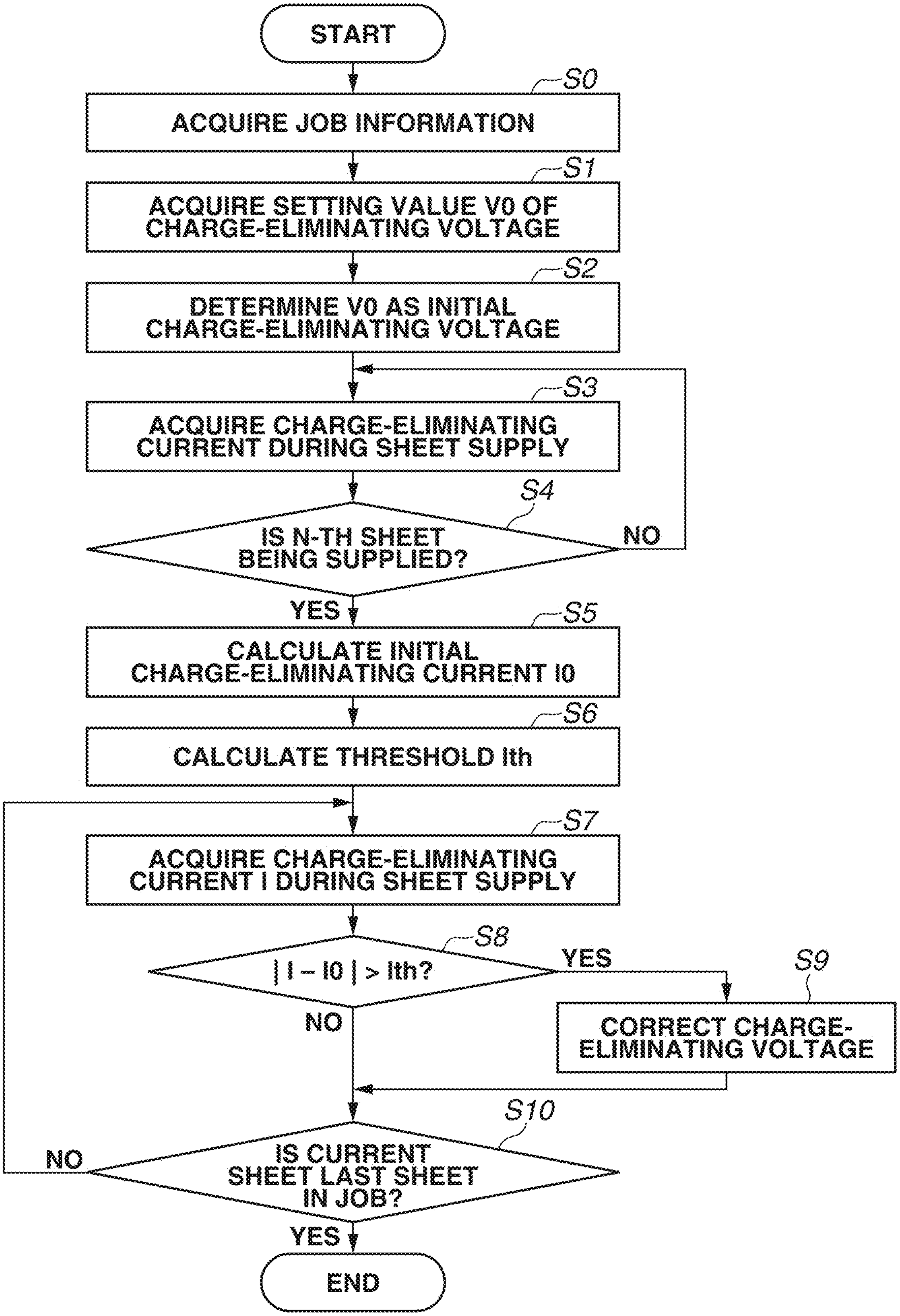
FIG. 6 is a flowchart illustrating a control method according to the first exemplary embodiment.

A charge-eliminating voltage control procedure performed by the control circuit 200 will be described with reference to the flowchart in FIG. 6. Hereinafter, an execution subject of each step in the flowchart is the CPU 201, unless otherwise specified.

When an image forming job is input to the image forming system 400, processing in the present flowchart is started. First, in step S0, the CPU 201 acquires job information, which has been set via the user operation unit 102. In the image forming apparatus 100, an image forming operation is started based on the job information. In step S1, the CPU 201 acquires the setting value of the charge-eliminating voltage from the charge elimination operation unit 54 in preparation for a charge elimination process in the charge-eliminating apparatus 300. In step S2, the CPU 201 determines the acquired setting value of the charge-eliminating voltage as the value of the charge-eliminating voltage (an initial charge-eliminating voltage), which will be output from the high-voltage power supply 55 during a period immediately after a start of the image forming job.

Hereinafter, a current value detected by the current detection circuit 55*a* between when the leading edge of the sheet S enters the charge-eliminating nip in the sheet conveying direction Cv and when the trailing edge of the sheet S exits the charge-eliminating nip will be referred to as a charge-eliminating current during sheet supply of this sheet S. It is assumed that, by applying the initial charge-eliminating voltage (a predetermined voltage value) to the charge-eliminating roller 51*b*, the charge-eliminating current during sheet supply of the first several sheets S in the image forming job represents a value that can appropriately eliminate static charges from the first several sheets S. However, for example, during execution of an image forming job to output a very large number of sheets S, if the resistance value of the charge-eliminating roller 51*b* fluctuates due to the above-described reasons, static charges cannot be eliminated appropriately from the sheets S. In the present exemplary embodiment, while the ionizer unit 52 disposed downstream of the charge-eliminating roller 51*b* also executes charge elimination, the amount of static charges that can be eliminated by the ionizer unit 52 is less than the amount of static charges that can be eliminated by the charge-eliminating roller 51*b*. Thus, if the charge-eliminating roller 51*b* cannot appropriately eliminate the static charges from the sheet S, the static charges of the sheet S may not be appropriately eliminated before the sheet S is discharged from the charge-eliminating apparatus 300.

Therefore, in the present exemplary embodiment, control is performed such that values of charge-eliminating currents flowing through a predetermined number N of sheets S initially conveyed in the image forming job are measured and stored as initial charge-eliminating currents, and the value of the charge-eliminating voltage thereafter is corrected based on the initial charge-eliminating currents.

It is desirable that the number (the predetermined number N) of sheets S, from which the initial charge-eliminating currents are determined, be two or more, so as to reduce an impact of variation among the sheets S. In the present exemplary embodiment, the predetermined number N is set to 3. However, a different value may be set as the predetermined number N.

In step S3, the CPU 201 determines the sheet S conveyed to the charge-eliminating apparatus 300 first after the start of the image forming job as the first sheet, and acquires the charge-eliminating current during sheet supply of each sheet S while counting a sheet number of the current sheet S being conveyed to the charge-eliminating apparatus 300. Next, if the sheet number of the current sheet S is the predetermined number N after the start of the job (YES in step S4), the processing proceeds to step S5. In step S5, the CPU 201 calculates an initial charge-eliminating current I0 based on the values of the charge-eliminating currents flowing through the first sheet S to the sheet S whose sheet number is the predetermined number N.

In the present exemplary embodiment, the mean value of the values of the charge-eliminating currents flowing through the first sheet S to the sheet S whose sheet number is the predetermined number N is set as the initial charge-eliminating current I0.

The initial charge-eliminating current I0 is a target value (a target current value) of the charge-eliminating current (a controlled variable, a controlled amount) during the execution of the image forming job. In other words, in the present exemplary embodiment, the target value of the charge-eliminating current is determined based on the detection result obtained by the current detection circuit 55*a* (the current detection unit) when the sheet S passes over the charge-eliminating roller 51*b* (the charge-eliminating member) in a state where the high-voltage power supply 55 (the voltage applying unit) applies a voltage of a predetermined voltage value to the charge-eliminating roller 51*b* after the job is started.

After calculating the initial charge-eliminating current I0, in step S6, the CPU 201 calculates a threshold Ith for determining whether to correct the charge-eliminating voltage. The threshold Ith is an amount (unit: μA) for determining whether to correct the charge-eliminating voltage. If a difference between the charge-eliminating current during sheet supply and the initial charge-eliminating current I0 is greater than the threshold Ith, the CPU 201 corrects the charge-eliminating voltage.

In the present exemplary embodiment, the threshold Ith is determined by the following method. Assuming that the setting value of the charge-eliminating voltage, which has been set via the charge elimination operation unit 54, is V0 (kV), the initial charge-eliminating current is I0, and a fluctuation range of the charge-eliminating voltage when the numerical value of the ones place is changed by 1 with the voltage adjustment switch 54*b* is ΔV (kV), the threshold Ith is calculated by the following equation.

$$Ith = |I0/V0 \times \Delta V|$$

In other words, the threshold Ith according to the present exemplary embodiment is defined as the absolute value of a value obtained by dividing the initial charge-eliminating current I0 by the setting value V0 of the charge-eliminating voltage and being multiplied by the fluctuation range ΔV of the charge-eliminating voltage corresponding to the minimum adjustment unit of the voltage adjustment switch 54*b*. For example, when the initial charge-eliminating current I0 is −40 μA, the setting value V0 of the initial charge-eliminating voltage is −4.0 kV, and the fluctuation range ΔV of the charge-eliminating voltage is −0.1 kV, the threshold Ith is 1.0 μA.

In step S7, when the current sheet S is a sheet subsequent to the sheet S whose sheet number is the predetermined number N after the start of the job, the CPU 201 acquires a charge-eliminating current I during sheet supply of the current sheet S. Next, in step S8, the CPU 201 compares the absolute value of a difference between the charge-eliminating current I during sheet supply and the initial charge-eliminating current I0 with the above-described threshold Ith. If the absolute value of the difference between the charge-eliminating current I and the initial charge-eliminating current I0 is greater than the threshold Ith (YES in step S8), the processing proceeds to step S9. In step S9, the CPU 201 determines that the value of the charge-eliminating voltage needs to be corrected, and corrects the value of the charge-eliminating voltage such that the charge-eliminating current becomes closer to the target value (I0). If the absolute value of the difference between the charge-eliminating current I and the initial charge-eliminating current I0 is the threshold Ith or less (NO in step S8), the CPU 201 determines that the value of the charge-eliminating voltage does not need to be corrected, and maintains the value of the charge-eliminating voltage.

For example, a case where the initial charge-eliminating current I0 is −40 μA, the setting value V0 of the initial voltage is −4.0 kV, the fluctuation range ΔV of the charge-eliminating voltage is −0.1 kV, and the threshold Ith is 1.0 μA will be considered. In this case, if the charge-eliminating current I during sheet supply of the current sheet S is a value smaller than −41 μA or a value greater than −39 μA, the CPU 201 corrects the charge-eliminating voltage in step S9. If the charge-eliminating current I of the fourth sheet S is −42 μA, the absolute value of the difference between the charge-eliminating current I and the initial charge-eliminating current I0 is 2 (μA), which is greater than the threshold Ith. Thus, the CPU 201 corrects the charge-eliminating voltage such that the absolute value of the charge-eliminating current I becomes small. A correction width of the charge-eliminating voltage is, for example, the fluctuation range ΔV of the charge-eliminating voltage corresponding to the minimum adjustment unit of the voltage adjustment switch 54*b*. More specifically, the value of the charge-eliminating voltage applied to the charge-eliminating roller 51*b* by the high-voltage power supply 55 is corrected from −4.0 kV, which is the setting value V0 of the initial charge-eliminating voltage, to −3.9 kV, which is a voltage lower by 0.1 kV.

In the present exemplary embodiment, a fixed value (0.1 kV) is used as the correction width of the charge-eliminating voltage irrespective of the magnitude of the absolute value of the difference between the detected charge-eliminating current I and the initial charge-eliminating current I0. However, the correction width may be changed based on the absolute value of the difference between the charge-eliminating current I and the initial charge-eliminating current I0.

Thereafter, the CPU 201 determines whether the current sheet S is the last sheet in the image forming job. If the current sheet S is not the last sheet (NO in step S10), the processing returns to step S7, and the processing in step S7 is executed on the subsequent sheet S. If the current sheet S is the last sheet (YES in step S10), the CPU 201 ends the processing in the present flowchart.

(Transition Examples of Charge-Eliminating Voltage and Charge-Eliminating Current)

Figure 7:
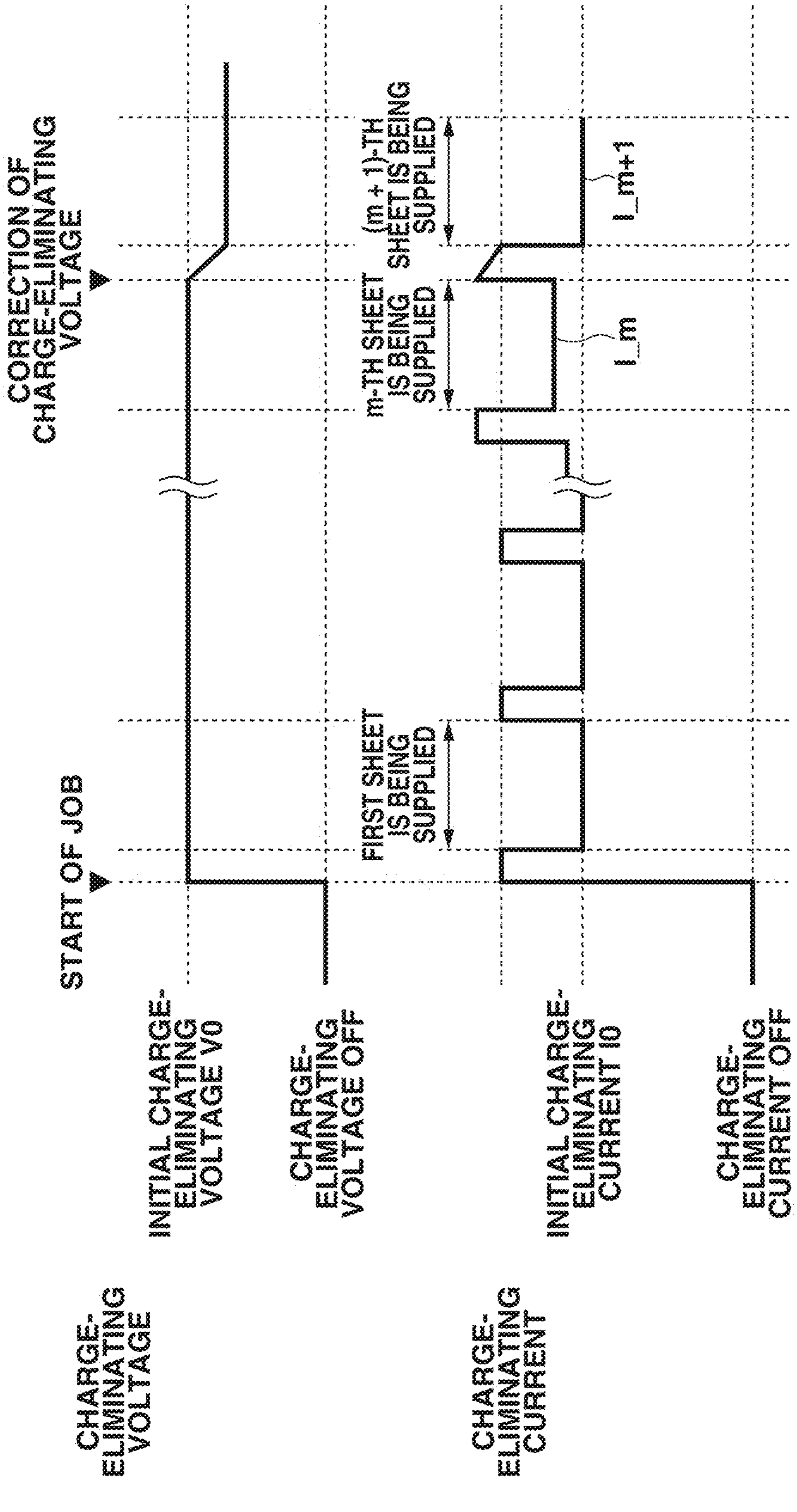
FIG. 7 illustrates transition examples of a charge-eliminating current and a charge-eliminating voltage according to the first exemplary embodiment.

FIG. 7 illustrates transition examples of the charge-eliminating voltage and the charge-eliminating current when the above control is performed. The initial charge-eliminating voltage at the setting value V0 of the charge-eliminating voltage is applied to several sheets S immediately after the start of the image forming job, and the charge-eliminating current during sheet supply is the initial charge-eliminating current I0. However, the value of the charge-eliminating current deviates from the initial charge-eliminating current I0 as time elapses.

In the example in FIG. 7, the absolute value of a charge-eliminating current I_m during sheet supply of the m-th sheet S after the start of the job is greater than the absolute value of the initial charge-eliminating current I0, and a difference therebetween is greater than the threshold Ith. In this case, the correction of the charge-eliminating voltage (step S9 in FIG. 6) is performed after the m-th sheet S passes through the charge-eliminating nip and before the (m+1)-th sheet S enters the charge-eliminating nip. The charge-eliminating voltage is corrected to a voltage value smaller than the initial charge-eliminating voltage (V0) such that the charge-eliminating current becomes closer to the initial charge-eliminating current I0, i.e., in this case, such that the absolute value of the charge-eliminating current becomes small. As a result, the charge-eliminating current I_m+1 of the (m+1)-th sheet S becomes a value closer to the initial charge-eliminating current I0.

(Modification of Method for Determining Target Value of Charge-Eliminating Current)

The present exemplary embodiment assumes that, as described above, charge-eliminating voltage adjustment work has already been completed before the start of the image forming job, and uses the initial charge-eliminating current I0, which is the charge-eliminating current immediately after the start of the image forming job, as the target value of the charge-eliminating current when the charge-eliminating voltage is controlled. However, the target value of the charge-eliminating current when the charge-eliminating voltage is controlled may be determined by a different method.

For example, in a case where the charge-eliminating voltage adjustment work is performed separately from an image forming job, processing for writing the target value of the charge-eliminating current in the RAM 210 may be performed as a part of a process performed by the control circuit 200 of the charge-eliminating apparatus 300 in the adjustment work.

Specifically, when the user determines that the amount of static charges on the sheet S is sufficiently small and notifies the apparatus of completion of the charge-eliminating voltage adjustment work, the CPU 201 writes the value of the charge-eliminating current during the immediately preceding sheet supply as the target value of the charge-eliminating current in the RAM 210. Next, when an image forming job is input, the CPU 201 corrects the charge-eliminating voltage from the first sheet S in the image forming job by using the target value of the charge-eliminating current read from the RAM 210. More specifically, the target value of the charge-eliminating current read from the RAM 210 may be used instead of the initial charge-eliminating current I0 in step S8 in the flowchart in FIG. 6.

In this case, the target value of the charge-eliminating current is set in advance before the first sheet in the image forming job reaches the charge-eliminating roller 51*b* (the charge-eliminating member). In a case where the absolute value of the difference between the charge-eliminating current during sheet supply of the first sheet S in the image forming job and the target value of the charge-eliminating current is greater than the threshold Ith, the correction of the charge-eliminating voltage is performed before the second sheet S enters the charge-eliminating nip.

(Advantages of Performing Control Based on Charge-Eliminating Current During Sheet Supply)

In both the present exemplary embodiment and the modification described above, the charge-eliminating voltage is corrected based on the comparison between the detection result of the charge-eliminating current during sheet supply and the target value of the charge-eliminating current during sheet supply. This is because the value of the current for appropriately eliminating static charges from the sheet S can be uniquely determined by using the charge-eliminating current during sheet supply. Thus, even when the resistance value of the charge-eliminating roller 51*b* fluctuates, the charge-eliminating voltage can be corrected based on the resistance value of the charge-eliminating roller 51*b* such that the magnitude of the charge-eliminating current is maintained within an appropriate range.

However, instead of a method of using the charge-eliminating current during sheet supply, a voltage may be applied to the charge-eliminating roller 51*b* when no sheet S is passing through the charge-eliminating nip (during non-sheet supply), and the charge-eliminating voltage may be corrected based on the relationship between the applied voltage and a current flowing through the charge-eliminating roller 51*b*. However, with this method, for example, when a plastic film or synthetic paper is used as the sheet S, it may be difficult to appropriately correct the charge-eliminating voltage.

The sheet S made of a synthetic resin such as a plastic film and synthetic paper is a typical example of a sheet S that highly needs charge elimination by the charge-eliminating apparatus 300. Because such a sheet S has extremely high resistance, a very large amount of static charges may be generated when the sheet S is charged.

More specifically, when the sheet S is exposed to the bias electric field at the secondary transfer portion T2, the front and back surfaces of the sheet S are charged to polarities opposite to each other by dielectric polarization. As a sheet S has higher resistance, the amount of static charges on the surface of the sheet S is less likely to attenuate even after the sheet S passes through the secondary transfer portion T2. As the amount of static charges on the surface of the sheet S increases, the sheet S is more likely to stick to another sheet S due to electrostatic adsorption, and thus, the necessity of the charge elimination increases.

The amount of charges held by a sheet S immediately before its entering into the charge-eliminating nip affects the magnitude of the charge-eliminating current during sheet supply. This is because, in a state in which the sheet S is sandwiched by the charge-eliminating roller pair 51, the charges held by the sheet S function as an electromotive force that causes a current to flow through the circuit including the charge-eliminating roller pair 51, the high-voltage power supply 55, and the ground potential GND (FIG. 2). Therefore, the magnitude of the charge-eliminating current during sheet supply is not determined only by the value of the charge-eliminating voltage and the resistance value of the charge-eliminating roller 51*b*, and it is desirable that the amount of charges held in the sheet S itself be considered, too. In other words, since the current value indicated by the current detection circuit 55*a* when no sheet S is passing through the charge-eliminating nip does not include the amount of charges held by the sheet S, it is difficult to uniquely determine an appropriate current condition for executing charge elimination on the sheet S. The current condition referred to herein is a condition that needs to be satisfied by the current flowing through the charge-eliminating roller 51*b* in relation to the voltage applied to the charge-eliminating roller 51*b*. If the appropriate current condition is not determined, it is difficult to uniquely determine the value of the charge-eliminating voltage as a control value for causing an appropriate current to flow to execute the charge elimination on the sheet S.

Figure 8A:
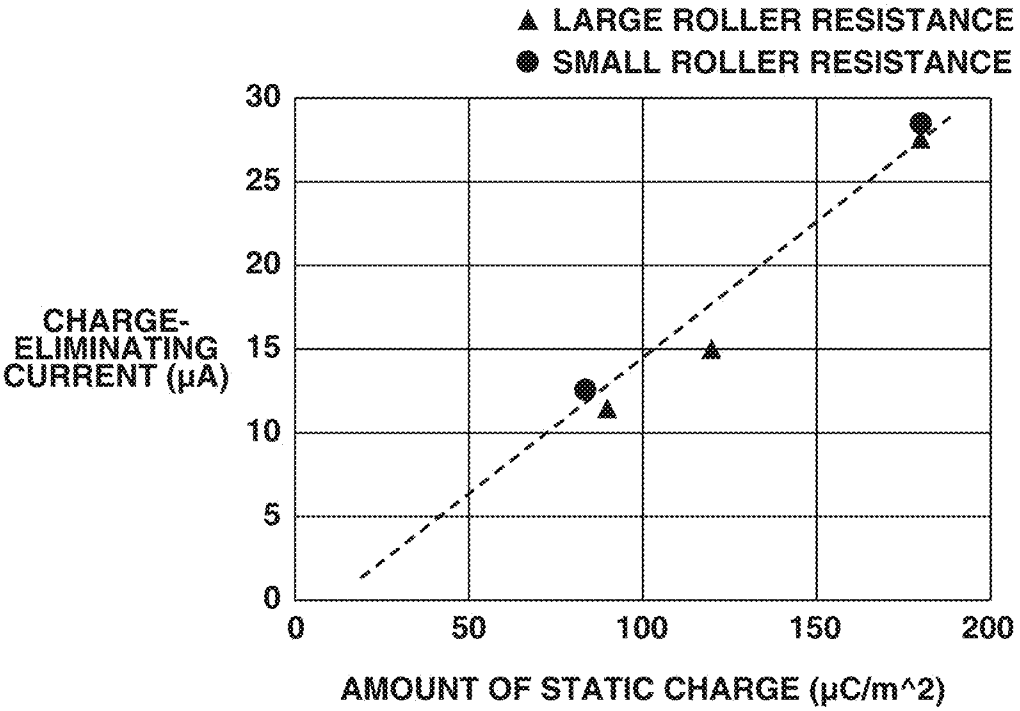
FIGS. 8A and 8B each illustrate a relationship between a charge-eliminating current and the amount of static charges on a sheet according to the first exemplary embodiment.
Figure 8B:
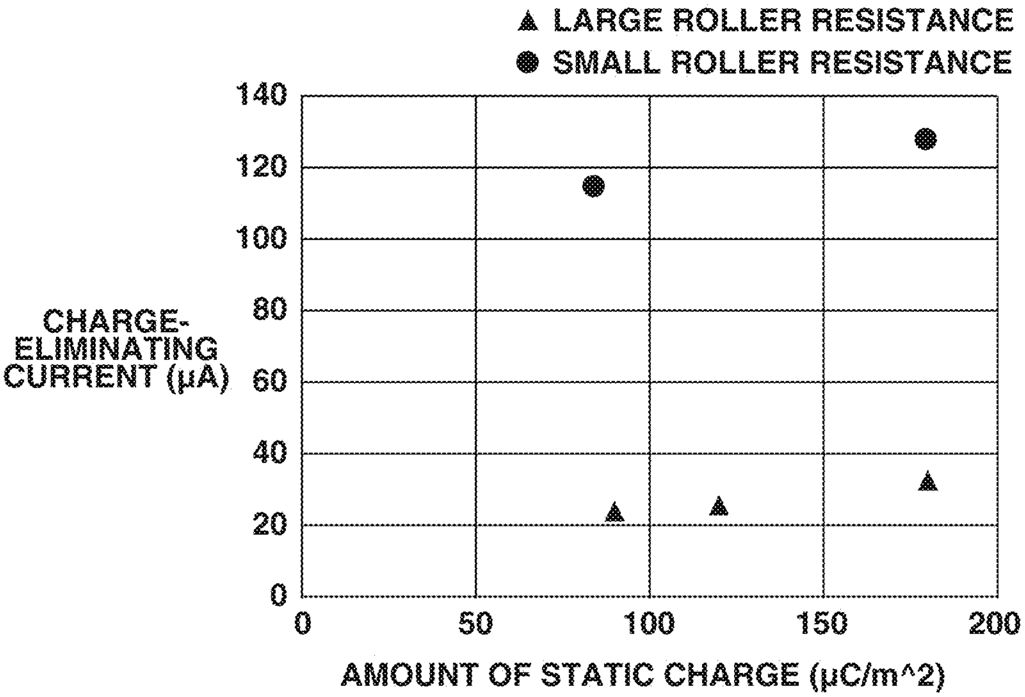

The above issue will be further described with reference to FIGS. 8A and 8B. Each of FIGS. 8A and 8B illustrates, separately for a case where the charge-eliminating roller 51*b* has a large resistance value and for a case where the charge-eliminating roller 51*b* has a small resistance value, a relationship between the amount of charges (the amount of static charges) when synthetic paper is charged in advance and the magnitude of the charge-eliminating current needed to eliminate the amount of static charges at the charge-eliminating nip. The vertical axis in FIG. 8A indicates the value of the charge-eliminating current when a sheet S is passing through the charge-eliminating nip (during sheet supply). The vertical axis in FIG. 8B indicates the value of the charge-eliminating current when a sheet S is not passing through the charge-eliminating nip (during non-sheet supply).

As indicated in FIG. 8A, the value of the charge-eliminating current during sheet supply that can appropriately eliminate static charges from the sheet S is uniquely determined as a value approximately proportional to the amount of static charges, irrespective of the magnitude of the resistance value of the charge-eliminating roller 51*b*. In other words, even when the resistance value of the charge-eliminating roller 51*b* fluctuates, the static charges can be appropriately eliminated from the sheet S by performing the control such that the charge-eliminating current during sheet supply becomes an appropriate value.

In contrast, as indicated in FIG. 8B, the value of the charge-eliminating current during non-sheet supply that can appropriately eliminate static charges from the sheet S greatly changes depending on the magnitude of the resistance value of the charge-eliminating roller 51*b*, and is not uniquely determined based on the amount of static charges. In other words, even if the charge-eliminating voltage is adjusted in advance to be a voltage value suitable for appropriately eliminating a certain amount of static charges on the sheet S, the value of the charge-eliminating current during non-sheet supply greatly depends on the resistance value of the charge-eliminating roller 51*b* rather than the amount of static charges on the sheet S. If, during the execution of the image forming job, the charge-eliminating voltage is corrected based on the charge-eliminating current during non-sheet supply, the charge-eliminating current during sheet supply can deviate from the value suitable for eliminating the static charges from the sheet S.

Summary of Present Exemplary Embodiment

As described above, the control circuit 200 (the control unit) according to the present exemplary embodiment detects the charge-eliminating current during sheet supply, and controls the value of the voltage applied to the charge-eliminating roller 51*b* (the charge-eliminating member) by the high-voltage power supply 55 (the voltage applying unit) such that the charge-eliminating current during sheet supply falls within the predetermined range with respect to the target value. In the present exemplary embodiment, an example of the "target value" is the initial charge-eliminating current I0, and an example of the "predetermined range" is the range in which the absolute value of the difference between the charge-eliminating current during sheet supply and the initial charge-eliminating current I0 is the threshold Ith (the predetermined threshold) or less.

In this way, even when the resistance value of the charge-eliminating roller 51*b* changes due to continuous voltage application or the like, the charge-eliminating voltage can be controlled such that a charge-eliminating current of an appropriate magnitude corresponding to the amount of static charges on the sheet S flows. As a result, a state is created where the charge-eliminating roller 51*b* can eliminate the static charges more appropriately from the sheet S.

In other words, the present exemplary embodiment can provide a charge-eliminating apparatus capable of eliminating the static charges more appropriately from the sheets, and can provide an image forming system including the charge-eliminating apparatus.

If the initial charge-eliminating voltage (V0) is maintained without using the present exemplary embodiment, the value of the charge-eliminating current during sheet supply can change during execution of an image forming job due to a change in the resistance value of the charge-eliminating roller 51*b*. In this case, the charge-eliminating roller 51*b* cannot appropriately eliminate the static charges from the sheet S, and consequently, the sheets S can stick to each other.

In a case where, to avoid the sticking of the sheets S, the user performs the charge-eliminating voltage adjustment work by interrupting an image forming job or at certain time intervals in a day, the burden on the user increases. The charge-eliminating voltage adjustment work involves a series of operations of, for example, (1) operating the image forming system 400 to output a test sheet, (2) manually measuring the amount of static charges on the output test sheet by using a surface electrometer, and (3) increasing or decreasing the value of the charge-eliminating voltage with the voltage adjustment switch 54*b* (FIG. 4) based on a measurement result. The adjustment work is repeated until the amount of static charges on the test sheet becomes sufficiently small.

In contrast, in the present exemplary embodiment, the charge-eliminating current during sheet supply is detected during execution of the image forming job, and the charge-eliminating voltage is automatically corrected such that the charge-eliminating current during sheet supply becomes closer to the target value. In other words, when executing a job that eliminates static charges from a plurality of sheets while continuously conveying the sheets, the control circuit 200 corrects the value of the voltage applied to the charge-eliminating roller 51*b* (the charge-eliminating member) by the high-voltage power supply 55 (the voltage applying unit) during the execution of the job. The correction of the voltage is performed based on the detection result obtained by the current detection circuit 55*a* (the current detection unit) when a preceding sheet passes over the charge-eliminating roller 51*b* such that the current flowing through the charge-eliminating roller 51*b* when a subsequent sheet, which is conveyed after the preceding sheet, passes over the charge-eliminating roller 51*b* falls within the predetermined range.

The present exemplary embodiment can maintain the state in which the charge-eliminating roller 51*b* can eliminate static charges more appropriately from the sheets S without increasing the burden on the user, and thus, the sticking of the sheets can be prevented.

Modification

In the present exemplary embodiment, the user can set the value of the charge-eliminating voltage to be applied by the high-voltage power supply 55 to the charge-eliminating roller 51*b* by operating the charge elimination operation unit 54 (FIG. 4). Alternatively, the user may set the setting value V0 of the charge-eliminating voltage by operating the user operation unit 102. The charge-eliminating apparatus 300 may include a sensor for measuring the amount of static charges (surface potential) on a sheet S, and the control circuit 200 may automatically set the setting value V0 of the charge-eliminating voltage based on the detection result of the sensor.

In the present exemplary embodiment, it is described that the charge-eliminating voltage is automatically corrected during the execution of an image forming job based on the detection result of the charge-eliminating current during sheet supply. Also, similar control may be applied to a mode (an adjustment mode) in which an adjustment of the charge-eliminating voltage is performed as a job separate from the image forming job. The CPU 201 starts the adjustment mode in a case where the user instructs the CPU 201 to execute the adjustment mode via the user operation unit 102, for example. In the adjustment mode, a test image is formed by the same process as that of normal image formation, and the charge-eliminating apparatus 300 executes charge elimination. In the charge elimination, the voltage applied to the charge-eliminating roller 51*b* is set to a value set in advance based on conditions such as the type and size of the sheet. The target value of the charge-eliminating current is set to a value set in advance based on the conditions such as the type and size of the sheet. If the absolute value of the difference between the detection result of the charge-eliminating current obtained when a test sheet passes over the charge-eliminating roller 51*b* (corresponding to step S7 in FIG. 6) and the target value of the charge-eliminating current is greater than the threshold Ith, the charge-eliminating voltage is corrected (step S9). A plurality of test sheets may be output until the absolute value of the difference between the detection result of the charge-eliminating current and the target value reaches the threshold Ith or less. When the absolute value reaches the threshold Ith or less, the adjustment mode may be ended assuming that the adjustment of the charge-eliminating voltage is completed. In this way, the control method described in the present exemplary embodiment may be applied as control of the charge-eliminating voltage in the adjustment mode.

A second exemplary embodiment will be described. The second exemplary embodiment differs from the first exemplary embodiment in controlling a charge-eliminating voltage.

Hereinafter, elements denoted by the same reference numerals as those in the first exemplary embodiment basically have the same configurations and operations as those described in the first exemplary embodiment, unless otherwise specified. Differences from the first exemplary embodiment will be mainly described.

A charge-eliminating apparatus 300 according to the present exemplary embodiment includes a detection unit (an environment detection unit) that detects an environmental condition under which the charge-eliminating apparatus 300 (an image forming system 400) is installed, and has a function of automatically changing the target value of the charge-eliminating current used for controlling the charge-eliminating voltage based on the environmental condition. The "environmental condition" referred to herein may be humidity (which may be relative humidity or absolute humidity), temperature, or a combination of the temperature and the humidity.

In the first exemplary embodiment, the target value of the charge-eliminating current during sheet supply is the initial charge-eliminating current I0 (or a value determined by the method described in the modification), and the target value is constant during execution of the image forming job. This configuration makes it possible to appropriately control the charge-eliminating voltage by a simple method in a case where the resistance value of the charge-eliminating roller 51*b* changes due to continuous voltage application and where the amount of static charges on the sheet S does not change very much.

However, when the environmental condition under which the charge-eliminating apparatus 300 or the image forming system 400 is installed changes, the amount of static charges on the sheet S conveyed to the charge-eliminating apparatus 300 can also change. As described above, if the amount of static charges on the sheet S changes, the charge-eliminating current suitable for eliminating the static charges from the sheet S also changes.

The amount of static charges on the sheet S changes based on the environmental condition because, for example, the current value for efficiently performing transfer of a toner image at the secondary transfer portion T2 of the image forming apparatus 100 changes based on the environmental condition. In addition, the attenuation of the amount of static charges changes while the sheet S is being conveyed from the secondary transfer portion T2 to the charge-eliminating roller 51*b* based on the environmental condition.

Therefore, in the present exemplary embodiment, the charge-eliminating voltage is corrected such that the charge-eliminating current during sheet supply is brought closer to the target value by changing the target value of the charge-eliminating current during sheet supply based on the environmental condition.

The charge-eliminating apparatus 300 includes an environment sensor 13 (FIG. 5) as an environment detection unit. A known temperature and humidity sensor may be used as the environment sensor 13 according to the present exemplary embodiment. A control circuit 200 can acquire information (environment information) about an ambient environment in which the charge-eliminating apparatus 300 or the image forming system 400 is installed based on a detection result of the environment sensor 13. The environment sensor 13 may be disposed outside a housing of the charge-eliminating apparatus 300 (for example, inside an image forming apparatus 100).

Figure 9:
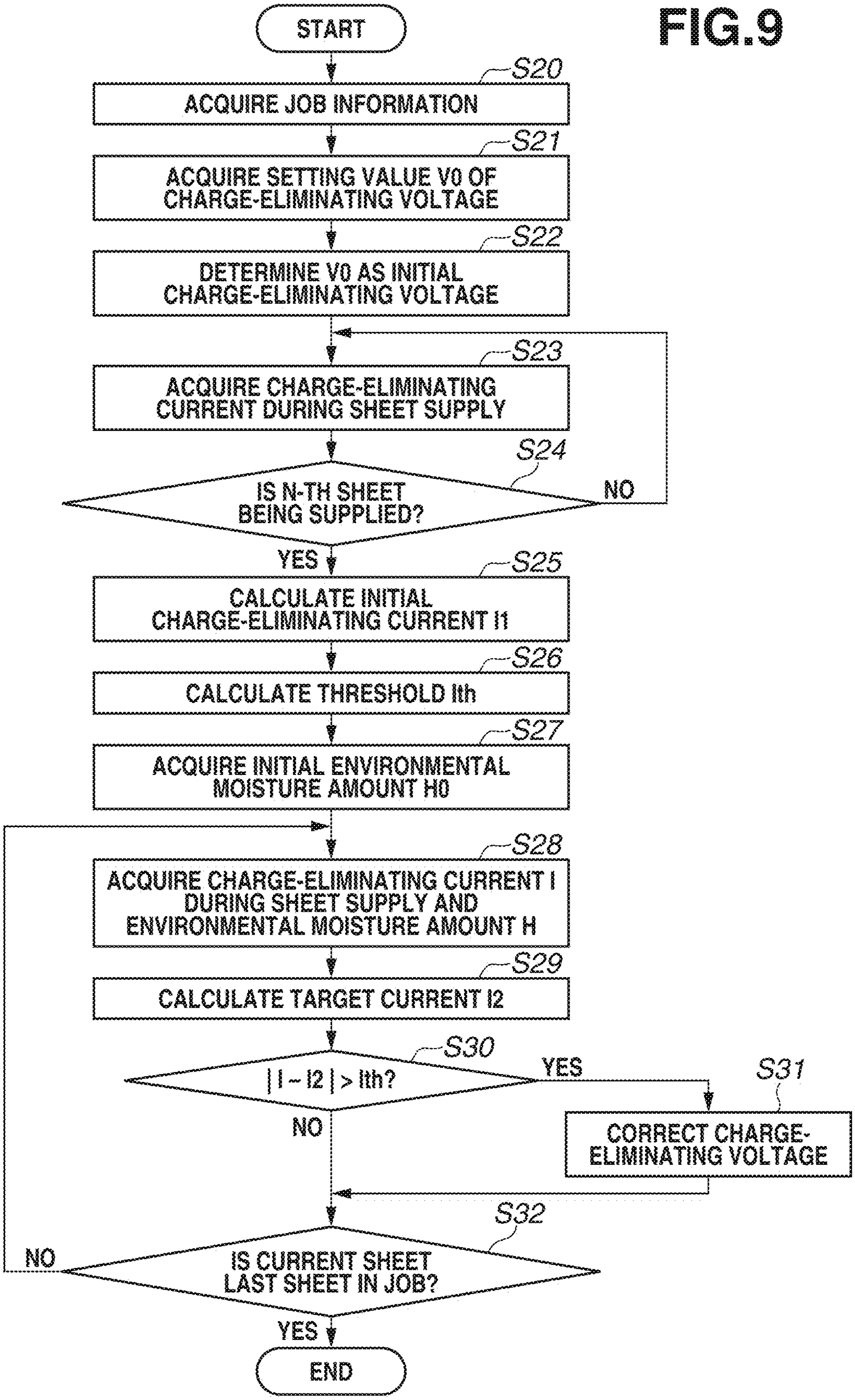
FIG. 9 is a flowchart illustrating a control method according to a second exemplary embodiment.

A charge-eliminating voltage control procedure performed by the control circuit 200 will be described with reference to the flowchart in FIG. 9. Hereinafter, the execution subject of each step in the flowchart is a CPU 201, unless otherwise specified.

When an image forming job is input to the image forming system 400, processing in the present flowchart is started. First, in step S20, the CPU 201 acquires job information, which has been set via a user operation unit 102. In the image forming apparatus 100, an image forming operation is started based on the job information. In step S21, the CPU 201 acquires the setting value of the charge-eliminating voltage from a charge elimination operation unit 54 in preparation for a charge elimination process in the charge-eliminating apparatus 300. In step S22, the CPU 201 determines the acquired setting value of the charge-eliminating voltage as the value of the charge-eliminating voltage (an initial charge-eliminating voltage), which will be output from a high-voltage power supply 55 during a period immediately after a start of the image forming job.

For the same reason as that in the first exemplary embodiment, control is performed such that values of charge-eliminating currents flowing through a predetermined number N of sheets S initially conveyed in the image forming job are measured and stored as initial charge-eliminating currents, and the value of the charge-eliminating voltage thereafter is corrected based on the initial charge-eliminating currents.

In step S23, the CPU 201 determines the sheet S conveyed to the charge-eliminating apparatus 300 first after the start of the image forming job as the first sheet, and acquires the charge-eliminating current during sheet supply of each sheet S while counting a sheet number of the current sheet S being conveyed to the charge-eliminating apparatus 300. Next, if the sheet number of the current sheet S is the predetermined number N after the start of the job (YES in step S24), the processing proceeds to step S25. In step S25, the CPU 201 calculates an initial charge-eliminating current I1 based on the values of the charge-eliminating currents flowing through the first sheet S to the sheet S whose sheet number is the predetermined number N. In the present exemplary embodiment, the mean value of the values of the charge-eliminating currents flowing through the first sheet S to the sheet S whose sheet number is the predetermined number N is set as the initial charge-eliminating current I1. For example, the predetermined number N is 3. The initial charge-eliminating current I1 is the target value to which the charge-eliminating current (a controlled variable, a controlled amount) needs to be brought closer during the execution of the image forming job.

After calculating the initial charge-eliminating current I1, in step S26, the CPU 201 calculates a threshold Ith for determining whether to correct the charge-eliminating voltage. The threshold Ith is an amount (unit: μA) for determining whether to correct the charge-eliminating voltage. If a difference between the charge-eliminating current during sheet supply and the initial charge-eliminating current I1 is greater than the threshold Ith, the CPU 201 corrects the charge-eliminating voltage.

In the present exemplary embodiment, the threshold Ith is determined by the following method. Assuming that the setting value of the charge-eliminating voltage, which has been set via the charge elimination operation unit 54, is V0 (kV), the initial charge-eliminating current is I1, and a fluctuation range of the charge-eliminating voltage when the numerical value of the ones place is changed by 1 with the voltage adjustment switch 54*b* is ΔV (kV), the threshold Ith is calculated by the following equation.

$$Ith = |I1/V0 \times \Delta V|$$

In other words, the threshold Ith according to the present exemplary embodiment is defined as the absolute value of a value obtained by dividing the initial charge-eliminating current I1 by the setting value V0 of the charge-eliminating voltage and being multiplied by the fluctuation range ΔV of the charge-eliminating voltage, the fluctuation range ΔV corresponding to the minimum adjustment unit of the voltage adjustment switch 54*b*. The absolute value of the calculated product is defined as the threshold Ith according to the present exemplary embodiment. For example, when the initial charge-eliminating current I1 is −40 μA, the setting value V0 of the initial charge-eliminating voltage is −4.0 kV, and the fluctuation range ΔV of the charge-eliminating voltage is −0.1 kV, the threshold Ith is 1.0 μA.

Further, at the same timing as the calculation of the initial charge-eliminating current I1, the CPU 201 acquires the environment information about an environment where the charge-eliminating apparatus 300 (or the image forming system 400) is installed, as the detection result of the environment sensor 13. In the present exemplary embodiment, the environment information acquired from the environment sensor 13 indicates temperature and humidity (relative humidity). In step S27, the CPU 201 acquires the amount of environmental moisture (absolute humidity: the weight of moisture per 1 kg of dry air) around the charge-eliminating apparatus 300 immediately after the start of the image forming job, based on the acquired temperature and humidity. The amount of environmental moisture around the charge-eliminating apparatus 300 immediately after the start of the image forming job is determined as an initial environmental moisture amount H0 (g/kg).

In step S28, when the current sheet S is a sheet subsequent to the sheet S whose sheet number is the predetermined number N after the start of the job, the CPU 201 acquires a charge-eliminating current I during sheet supply of the current sheet S and a current environmental moisture amount H. Further, in step S29, the CPU 201 calculates a target current I2, which is a value obtained by correcting the initial charge-eliminating current I1 based on the current environmental moisture amount H and an environment table (FIG. 5) stored in a ROM 220. As is the case with the initial charge-eliminating current I1, the target current I2 is the target value to which the charge-eliminating current (the controlled variable, the controlled amount) needs to be brought closer during the execution of the image forming job. During the execution of the image forming job, a period during which the target current I2 is used as the target value is after a period during which the initial charge-eliminating current I1 is used as the target value.

Figure 10:
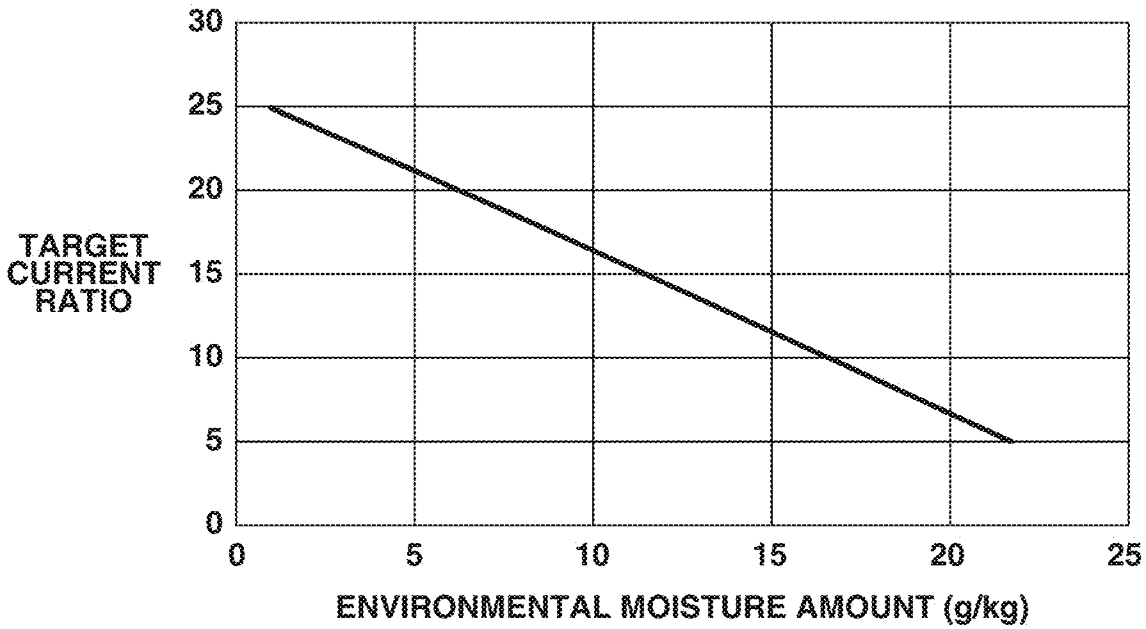
FIG. 10 is a diagram for illustrating control based on an environmental moisture amount according to the second exemplary embodiment.

The environment table is information representing a ratio of increase or decrease in the target value of the charge-eliminating current based on the environmental condition. As illustrated in FIG. 10, the environment table according to the present exemplary embodiment defines a correspondence relationship between an environmental moisture amount and a target current ratio (the relative magnitude of the target value of the charge-eliminating current). In step S29 in FIG. 9, the target current I2 is calculated by the following equation using the environment table.

$$I2=(\text{target current ratio corresponding to current environmental moisture amount } H)/(\text{target current ratio corresponding to initial environmental moisture amount } H0)\times I1$$

For example, when the initial charge-eliminating current I1 is −40 μA and the initial environmental moisture amount H0 is 0.88 g/kg, the target current ratio corresponding to the initial environmental moisture amount H0 is 10 (FIG. 10). In contrast, when the current environmental moisture amount H is 8.9 g/kg, the corresponding target current ratio is 7 (FIG. 10). In this case, the new target current I2 is (7/10)×(−40)=−28 μA.

In the present exemplary embodiment, the higher the absolute humidity detected by the environment sensor 13 (the environment detection unit) is, the smaller the target value of the charge-eliminating current becomes (a less amount of charges is supplied to the sheet). In other words, the target value of the charge-eliminating current in a case where the detected absolute humidity is a first value is larger than the target value in a case where the detected absolute humidity is a second value, which is larger than the first value. An example of the "first value" is 0.88 g/kg described above, and an example of the "second value" is 8.9 g/kg described above.

Next, in step S30, the CPU 201 compares the absolute value of a difference between the charge-eliminating current I during sheet supply and the target current I2 with the above-described threshold Ith. If the absolute value of the difference between the charge-eliminating current I and the target current I2 is greater than the threshold Ith (YES in step S30), the processing proceeds to step S31. In step S31, the CPU 201 determines that the value of the charge-eliminating voltage needs to be corrected, and corrects the value of the charge-eliminating voltage such that the charge-eliminating current becomes closer to the target value (I2). If the absolute value of the difference between the charge-eliminating current I and the target current I2 is the threshold Ith or less (NO in step S30), the CPU 201 determines that the value of the charge-eliminating voltage does not need to be corrected, and maintains the value of the charge-eliminating voltage.

For example, in the above case where the initial charge-eliminating current I1 is −40 μA, the initial environmental moisture amount H0 is 0.88 g/kg, and the target current I2 updated based on the current environmental moisture amount H is −28 μA, it is assumed that the charge-eliminating current I during sheet supply of the current sheet is −30 μA. In this case, the absolute value of the difference between the charge-eliminating current I and the target current I2 is 2 μA, which is greater than the threshold Ith that is 1 μA. Thus, the charge-eliminating voltage is corrected such that the absolute value of the charge-eliminating current I becomes small. A correction width of the charge-eliminating voltage is, for example, the fluctuation range ΔV of the charge-eliminating voltage corresponding to the minimum adjustment unit of the voltage adjustment switch 54*b*. More specifically, the value of the charge-eliminating voltage applied to the charge-eliminating roller 51*b* by the high-voltage power supply 55 is corrected from −4.0 kV, which is the setting value V0 of the initial charge-eliminating voltage, to −3.9 kV, which is a voltage lower by 0.1 kV.

In the present exemplary embodiment, a fixed value (0.1 kV) is used as the correction width of the charge-eliminating voltage irrespective of the magnitude of the absolute value of the difference between the detected charge-eliminating current I and the target current I2. However, the correction width may be changed based on the absolute value of the difference between the charge-eliminating current I and the target current I2.

Thereafter, the CPU 201 determines whether the current sheet S is the last sheet in the image forming job. If the current sheet S is not the last sheet (NO in step S32), the processing returns to step S28, and the processing in step S28 is executed on the subsequent sheet S. If the current sheet S is the last sheet (YES in step S32), the CPU 201 ends the processing in the present flowchart.

(Modifications of Method for Determining Target Value of Charge-Eliminating Current)

In the present exemplary embodiment, as described above, the target current I2, which is the target value of the charge-eliminating current, is updated based on the initial charge-eliminating current (I1) and the initial environmental moisture amount H0, which are obtained immediately after the start of the image forming job, and the current environmental moisture amount H. However, the method for determining the target value of the charge-eliminating current based on the environmental condition is not limited to the above method.

For example, as a part of a process performed by the control circuit 200 in the adjustment work separately from the image forming job, the control circuit 200 may perform processing for writing the initial environmental moisture amount H0 and the target value of the charge-eliminating current (equivalent to I1) corresponding to the initial environmental moisture amount H0 in the RAM 210. When the image forming job is started, the CPU 201 corrects the charge-eliminating voltage from the first sheet S in the image forming job by using the target value (I0) of the charge-eliminating current and the initial environmental moisture amount H0 that have been read from the RAM 210 and the current environmental moisture amount H. In other words, in the flowchart in FIG. 6, the target value of the charge-eliminating current read from the RAM 210 may be used instead of the initial charge-eliminating current I1 in the calculations of the threshold Ith and the target current I2 (steps S26 and S29). In this case, if the absolute value of the difference between the charge-eliminating current I during sheet supply of the first sheet S in the image forming job and the target current I2 is greater than the threshold Ith, the charge-eliminating voltage is corrected before the second sheet S enters the charge-eliminating nip.

In addition, the value of the target current I2 (the target value of the charge-eliminating current) determined for each classification of values of environmental moisture amounts by a preliminary study may be stored in a reference table in the ROM 220. In this case, when an image forming job is started, the CPU 201 refers to the reference table in the ROM 220 and reads the target current I2 corresponding to the current environmental moisture amount H. Next, the CPU 201 determines whether the correction of the charge-eliminating voltage is needed by comparing the absolute value of the difference between the charge-eliminating current I during sheet supply of the current sheet S and the target current I2 corresponding to the current environmental moisture amount H with the threshold Ith.

(Advantages of Using Target Value of Charge-Eliminating Current Based on Environmental Condition)

As described above, in the present exemplary embodiment, the CPU 201 corrects the charge-eliminating voltage based on the result of the comparison between the detection result of the charge-eliminating current and the target value of the charge-eliminating current while changing the target value of the charge-eliminating current based on the change in the environmental condition. In this way, even when the amount of static charges on the sheet S changes due to a change in the environmental condition, a more appropriate charge-eliminating voltage can be applied to the charge-eliminating roller 51*b*. As a result, the state in which the charge-eliminating roller 51*b* can eliminate the static charges more appropriately from the sheet S can be maintained.

Summary of Present Exemplary Embodiment

As described above, the control circuit 200 (the control unit) according to the present exemplary embodiment controls the value of the voltage applied to the charge-eliminating roller 51*b* (the charge-eliminating member) by the high-voltage power supply 55 (the voltage applying unit) based on the detection result of the current detection circuit 55*a* (the current detection unit) such that the current flowing through the charge-eliminating roller 51*b* falls within the predetermined range with respect to the target value. In addition, the control circuit 200 changes the target value based on the detection result of the environment sensor 13 (the environment detection unit). In the present exemplary embodiment, an example of the "target value" is the target current I2, and an example of the "predetermined range" is the range in which the absolute value of the difference between the charge-eliminating current during sheet supply and the target current I2 is the threshold Ith (the predetermined threshold) or less.

In this way, even when the amount of static charges on the sheet S or the like changes due to a change in the environmental condition, the charge-eliminating voltage can be controlled such that the charge-eliminating current of an appropriate magnitude corresponding to the amount of static charges on the sheet S flows. As a result, a state is created where the charge-eliminating roller 51*b* can eliminate the static charges more appropriately from the sheet S.

In other words, the present exemplary embodiment can provide a charge-eliminating apparatus capable of eliminating the static charges more appropriately from the sheets, and can provide an image forming system including the charge-eliminating apparatus.

In the present exemplary embodiment, the target value of the charge-eliminating current is changed based on the detection result of the environment sensor 13 (the environment detection unit) during the execution of a job that eliminates static charges from a plurality of sheets while continuously conveying the sheets. Thus, for example, even when the environmental condition changes during the execution of the image forming job, a state is created where the charge-eliminating roller 51*b* can eliminate the static charges more appropriately from the sheets S.

More specifically, at a first time point during a job, the initial charge-eliminating current I1 is determined as the target value of the charge-eliminating current based on the detection result obtained by the current detection circuit 55*a* (the current detection unit) when the sheet passes over the charge-eliminating roller 51*b* (the charge-eliminating member) in a state where the high-voltage power supply 55 (the voltage applying unit) applies a voltage of a predetermined voltage value to the charge-eliminating roller 51*b*. At a second time point subsequent to the first time point during the job, the target value of the charge-eliminating current is changed from the initial charge-eliminating current I1 to the target current I2 based on the target value at the first time point, the detection result of the environment sensor 13 (the environment detection unit) at the first time point, and the detection result of the environment sensor 13 at the second time point. In this way, the target value of the charge-eliminating current can be updated to a more appropriate value based on a change in the environmental condition.

In addition, as in the first exemplary embodiment, the control circuit 200 (the control unit) according to the present exemplary embodiment detects the charge-eliminating current during sheet supply, and controls the value of the voltage applied to the charge-eliminating roller 51*b* (the charge-eliminating member) by the high-voltage power supply 55 (the voltage applying unit) such that the charge-eliminating current during sheet supply falls within the predetermined range with respect to the target value. In this way, even when the resistance value of the charge-eliminating roller 51*b* changes due to continuous voltage application or the like, the charge-eliminating voltage can be controlled such that the charge-eliminating current of an appropriate magnitude corresponding to the amount of static charges on the sheet S flows. As a result, a state is created where the charge-eliminating roller 51*b* can eliminate the static charges more appropriately from the sheet S.

Modification

In the present exemplary embodiment, the configuration is described where the charge-eliminating voltage is controlled based on the detection result of the charge-eliminating current during sheet supply, as in the first exemplary embodiment. Also, in the present exemplary embodiment, the charge-eliminating voltage may be controlled based on the detection result of the charge-eliminating current when no sheet S is passing over the charge-eliminating roller 51*b* (during non-sheet supply) such that the charge-eliminating current during the non-sheet supply falls within the predetermined range with respect to the target value. However, when a high-resistance sheet S, such as synthetic paper, is handled, it is desirable to perform the control based on the detection result of the charge-eliminating current during sheet supply, for the reason described in the first exemplary embodiment.

In the second exemplary embodiment, the configuration is described where the target value of the charge-eliminating current is changed based on the environmental condition of the environment where the charge-eliminating apparatus 300 is installed. However, the target value of the charge-eliminating current may be changed based on other conditions. In a third exemplary embodiment, an example in which the target value of the charge-eliminating current is changed based on the conveyance velocity of the sheet S or the sheet width and type of the sheet S will be described. Hereinafter, elements denoted by the same reference numerals as those in the first and second exemplary embodiments basically have the same configurations and operations as those described in the first and second exemplary embodiments unless otherwise specified, and the differences from the first and second exemplary embodiments will be mainly described.

A table (a velocity ratio table) for converting the target value of the charge-eliminating current based on the conveyance velocity of the sheet S is stored in a ROM 220 of a control circuit 200 of the present exemplary embodiment (FIG. 5). The ROM 220 also stores a table (a sheet type table) for converting the target value of the charge-eliminating current based on the sheet type and a table (a sheet width table) for converting the target value of the charge-eliminating current based on the sheet width. As with the environment table (FIG. 10) in the second exemplary embodiment, when a certain condition changes, these tables can convert the target value of the charge-eliminating current based on the conditions before and after the change. As long as the target value of the charge-eliminating current can be converted based on a change in a condition, the format of the information stored in the ROM 220 is not limited to a table. The information may be parameters of a function representing a conversion formula.

The sheet type is a sheet category classified at least by sheet material, such as synthetic paper and plain paper. The sheet width is a sheet length in the sheet width direction perpendicular to the sheet conveyance direction.

When only the conveyance velocity of a sheet S changes while the other conditions are constant, the target value of the charge-eliminating current is inversely proportional to the conveyance velocity. More specifically, in a case where the target current when the conveyance velocity is v1 is I1, the target current I2 when the conveyance velocity changes to v2 is represented by $I2=I1\times v2/v1$. In other words, when the conveyance velocity increases, the target value of the charge-eliminating current increases.

The direction of increase or decrease of the target value of the charge-eliminating current with respect to a change in the sheet type and sheet width of a sheet S varies depending on a specific condition. This is because the value of the charge-eliminating current suitable for eliminating static charges from a sheet S changes due to a plurality of factors, such as a resistance value of the sheet S, a resistance value of the charge-eliminating roller 51*b*, a difference between the sheet width and the longitudinal width of the charge-eliminating roller 51*b*, and amount of static charges on the sheet S.

In the present exemplary embodiment, the target value of the charge-eliminating current is changed based on at least one of the conveyance velocity of the sheet S, the sheet width, and the sheet material, as is the case with the change of the target value of the charge-eliminating current based on the environmental condition in the second exemplary embodiment. In this way, the target value of the charge-eliminating current can be set to a more appropriate value based on the situation where the charge-eliminating roller 51*b* eliminates the static charges from the sheet S.

In the exemplary embodiments described above, the charge-eliminating apparatus 300, which eliminates static charges from a sheet S, has been described. However, the charge-eliminating apparatus 300 has a function as a charge adjusting apparatus that adjusts the charged state of the sheet S by supplying charges to the sheets S via the charge-eliminating roller 51*b* as a charge applying member. The charge adjusting apparatus may not necessarily reduce the amount of static charges on the sheet S (not necessarily eliminate the static charges). For example, in a state where sheets S are stacked after processing by the charge adjusting apparatus has been performed, the charge adjusting apparatus may be configured to adjust the amount of static charges on each surface of each sheet S such that surfaces of the overlapping sheets that face each other are charged to have the same polarity. Specifically, the charge adjusting apparatus applies a voltage to every other sheet S of a plurality of sheets S such that electrostatic polarities of surfaces of the every other sheet S are reversed. In this case, since surfaces of the overlapping sheets S that face each other are charged to have the same polarity, sticking of the sheets S to each other due to electrostatic adsorption can be reduced. In addition, by applying the control described in any of the above exemplary embodiments for controlling the voltage applied to the charge-eliminating roller 51*b* as the charge applying member, the charged state of the sheet S can be adjusted more appropriately.

In the exemplary embodiments described above, the charge-eliminating roller 51*b*, which is a roller member, has been described as an example of the contact type charge-eliminating member that comes into contact with the sheet S. However, the contact type charge-eliminating member is not limited thereto, and may be, for example, a brush member in which conductive fibers or long and thin conductive sheet pieces are brought into contact with the sheet S.

In the exemplary embodiments described above, the sheet S is charged mainly in the transfer portion in the electrophotographic process. However, the sheet S can be charged by frictional charging or peeling charging due to rubbing or peeling against a conveyance guide, a conveying roller, a conveyance belt, or the like in an image forming system other than the electrophotographic image forming system, for example, in an inkjet image forming system. Therefore, the present technique may be applied to an image forming system other than the electrophotographic image forming system.

Embodiments of the present disclosure can also be realized by processing in which computer-executable instructions for implementing at least one function of the above-described exemplary embodiments are supplied to a system or an apparatus via a network or a storage medium, and at least one processor in a computer of the system or the apparatus reads and executes the computer-executable instructions. Embodiments of the present disclosure can also be realized by a circuit (for example, an application specific integrated circuit (ASIC)) that implements at least one function.

The present disclosure can provide a charge-eliminating apparatus, an image forming system, and a charge adjusting apparatus that are capable of eliminating static charges from a sheet or adjusting a charged state of the sheet more appropriately.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-212348, which was filed on Dec. 15, 2023 and which is hereby incorporated by reference herein in its entirety.

What is claimed is:

1. A charge-eliminating apparatus comprising:

a charge-eliminating member configured to be in contact with a sheet and eliminate static charges from the sheet while the charge-eliminating member, together with an opposing charge-eliminating member disposed at a position where the opposing charge-eliminating member faces the charge-eliminating member, nips and conveys the sheet;

a power supply configured to apply a voltage to the charge-eliminating member;

a current detection circuit configured to detect a current flowing through the charge-eliminating member; and a control unit configured to control a value of the voltage applied to the charge-eliminating member by the power supply, based on a detection result obtained by the current detection circuit while the charge-eliminating member nips and conveys the sheet, such that the current flowing through the charge-eliminating member while the charge-eliminating member nips and conveys the sheet falls within a predetermined range with respect to a target value, wherein the control unit acquires a detection result of an environment detection sensor that detects an environmental condition, and wherein the control unit changes the target value based on the detection result of the environment detection sensor during execution of a job that eliminates static charges from a plurality of sheets while continuously conveying the plurality of sheets.

2. The charge-eliminating apparatus according to claim 1, wherein the target value is determined based on the detection result obtained by the current detection circuit while the charge-eliminating member nips and conveys the sheet in a state where the power supply applies a voltage of a predetermined voltage value to the charge-eliminating member.

3. The charge-eliminating apparatus according to claim 2, wherein, after the job is started, the target value is determined based on the detection result obtained by the current detection circuit while the charge-eliminating member nips and conveys the sheet in a state where the power supply applies a voltage of a predetermined voltage value to the charge-eliminating member.

4. The charge-eliminating apparatus according to claim 3, further comprising an input unit configured to allow a user to enter a value of the voltage to be applied to the charge-eliminating member by the power supply, wherein the predetermined voltage value is a value that has been entered via the input unit before the job is started.

5. The charge-eliminating apparatus according to claim 2, wherein, before the job is started, the target value is determined based on the detection result obtained by the current detection circuit while the charge-eliminating member nips and conveys the sheet in a state where the power supply applies the voltage of the predetermined voltage value to the charge-eliminating member.

6. The charge-eliminating apparatus according to claim 1, wherein, in the case where the control unit executes the job that eliminates static charges from the plurality of sheets while continuously conveying the plurality of sheets, the control unit corrects the value of the voltage applied to the charge-eliminating member by the power supply during the execution of the job based on a detection result obtained by the current detection circuit when a preceding sheet passes over the charge-eliminating member such that a current flowing through the charge-eliminating member when a subsequent sheet, which is conveyed after the preceding sheet, passes over the charge-eliminating member falls within the predetermined range.

7. The charge-eliminating apparatus according to claim 1, wherein the predetermined range is a range in which an absolute value of a difference between a current value detected by the current detection circuit and the target value is a predetermined threshold or less.

8. The charge-eliminating apparatus according to claim 1, wherein the target value is set in advance before a first sheet in the job passes over the charge-eliminating member.

9. The charge-eliminating apparatus according to claim 1, wherein the target value is changed based on at least one of a sheet conveyance velocity, a sheet length in a sheet width direction perpendicular to a sheet conveyance direction, and a sheet material.

10. The charge-eliminating apparatus according to claim 1, wherein the charge-eliminating member is a roller member including an elastic layer in which an ion conductive agent is dispersed.

11. The charge-eliminating apparatus according to claim 10, wherein the opposing charge-eliminating member is an opposing roller configured to be in contact with the charge-eliminating member and to form a nip portion that nips the sheet together with the charge-eliminating member, wherein the opposing roller is electrically grounded.

12. The charge-eliminating apparatus according to claim 1, wherein the environment detection sensor is configured to detect an absolute humidity of an environment in which the charge-eliminating apparatus is installed, and wherein the target value in a case where the absolute humidity detected by the environment detection sensor is a first value is larger than the target value in a case where the absolute humidity detected by the environment detection sensor is a second value that is larger than the first value.

13. The charge-eliminating apparatus according to claim 1, wherein, at a first time point during the execution of the job, the target value is determined based on the detection result obtained by the current detection circuit while the charge-eliminating member nips and conveys the sheet in a state where the power supply applies a voltage of a predetermined voltage value to the charge-eliminating member, and wherein, at a second time point subsequent to the first time point during the execution of the job, the target value is changed based on the target value at the first time point, a detection result of the environment detection sensor at the first time point, and a detection result of the environment detection sensor at the second time point.

14. The charge-eliminating apparatus according to claim 1, wherein, at a first time point during the execution of the job, the target value is determined based on the detection result obtained by the current detection circuit when the sheet passes over the charge-eliminating member in a state where the power supply applies a voltage of a predetermined voltage value to the charge-eliminating member, and wherein, at a second time point subsequent to the first time point during the execution of the job, in a case where an absolute value of a difference between a detection result of the environment detection sensor at the first time point and a detection result of the environment detection sensor at the second time point is a threshold or greater, the target value is changed to a target value corresponding to the detection result of the environment detection sensor at the second time point.

15. The charge-eliminating apparatus according to claim 1, wherein, at a first time point, the target value is determined based on the detection result obtained by the current detection circuit while the charge-eliminating member nips and conveys the sheet in a state where the power supply applies a voltage of a predetermined voltage value to the charge-eliminating member, and wherein, at a second time point subsequent to the first time point, the target value is changed based on the target value at the first time point, a detection result of the environment detection sensor at the first time point, and a detection result of the environment detection sensor at the second time point.

16. The charge-eliminating apparatus according to claim 1, wherein, at a first time point during the execution of the job, the target value is a first target value, and wherein, at a second time point subsequent to the first time point during the execution of the job, based on the detection result of the environment detection sensor during execution of the job that eliminates static charges from a plurality of sheets while continuously conveying the plurality of sheets, the target value is changed to a second target value from the first target value.

17. An image forming system comprising:

an image forming apparatus configured to form an image on a sheet; and the charge-eliminating apparatus according to claim 1, the charge-eliminating apparatus eliminating static charges from the sheet on which the image has been formed by the image forming apparatus.

18. A charge adjusting apparatus comprising:

a charge applying member configured to be in contact with a sheet and apply charges to the sheet while the charge applying member, together with an opposing charge applying member disposed at a position where the opposing charge applying member faces the charge applying member, nips and conveys the sheet;

a power supply configured to apply a voltage to the charge applying member;

a current detection circuit configured to detect a current flowing through the charge applying member; and a control unit configured to control a value of the voltage applied to the charge applying member by the power supply, based on a detection result obtained by the current detection circuit while the charge applying member nips and conveys the sheet, such that the current flowing through the charge applying member while the charge applying member nips and conveys the sheet represents a value within a predetermined range with respect to a target value, wherein the control unit acquires a detection result of an environment detection sensor that detects an environmental condition, and wherein the control unit changes the target value based on the detection result of the environment detection sensor during execution of a job that adjusts charges on a plurality of sheets while continuously conveying the plurality of sheets.

19. An image forming system comprising:

an image forming section configured to form an image on a sheet;

a charge-eliminating member configured to be in contact with a sheet and eliminate static charges from the sheet while the charge-eliminating member, together with an opposing charge-eliminating member disposed at a position where the opposing charge-eliminating member faces the charge-eliminating member, nips and conveys the sheet;

a power supply configured to apply a voltage to the charge-eliminating member;

a current detection circuit configured to detect a current flowing through the charge-eliminating member;

a control unit configured to control a value of the voltage applied to the charge-eliminating member by the power supply, based on a detection result obtained by the current detection circuit while the charge-eliminating member nips and conveys the sheet, such that the current flowing through the charge-eliminating member while the charge-eliminating member nips and conveys the sheet falls within a predetermined range with respect to a target value; and an environment detection sensor configured to detect an environmental condition, wherein the control unit acquires a detection result of the environment detection sensor that detects an environmental condition, and wherein the control unit changes the target value based on the detection result of the environment detection sensor during execution of a job that eliminates static charges from a plurality of sheets while continuously conveying the plurality of sheets.

* * * * *